United States Patent [19]
Miyaishi et al.

[11] Patent Number: 5,571,372
[45] Date of Patent: Nov. 5, 1996

[54] PROCESS AND APPARATUS FOR MANUFACTURING CLUTCH FRICTION PLATE

[75] Inventors: Kazuomi Miyaishi; Akihiro Agata; Hiroji Shimoi, all of Hamamatsu, Japan

[73] Assignee: Kabushiki Kaisha F.C.C., Hamamatsu, Japan

[21] Appl. No.: 325,884

[22] Filed: Oct. 19, 1994

Related U.S. Application Data

[62] Division of Ser. No. 922,921, Jul. 21, 1992.

[51] Int. Cl.$^6$ ................................................. B32B 31/00
[52] U.S. Cl. ........................ 156/515; 156/518; 156/521; 156/251
[58] Field of Search ................................. 156/515, 518, 156/519, 521, 256, 261, 264, 265, 266, 251

[56] References Cited

U.S. PATENT DOCUMENTS

| | | | |
|---|---|---|---|
| 1,939,275 | 12/1933 | Perry | 156/264 |
| 4,016,756 | 4/1977 | Kovner . | |
| 4,066,489 | 1/1978 | Hannum et al. | 156/258 |
| 4,753,702 | 6/1988 | Kurihara . | |
| 4,753,703 | 6/1988 | Jensen | 156/256 |
| 4,941,559 | 6/1990 | Ishikawa et al. | 192/107 R |
| 4,961,807 | 10/1990 | Ichiguchi | 156/261 |
| 5,092,207 | 3/1992 | Memschiner . | |
| 5,094,331 | 3/1992 | Fujimoto et al. | 192/70.12 |
| 5,105,536 | 4/1992 | Sololousky . | |

FOREIGN PATENT DOCUMENTS

| | | |
|---|---|---|
| 0353481 | 5/1989 | European Pat. Off. . |
| 2190968 | 12/1987 | United Kingdom . |
| WO88/02685 | 4/1988 | WIPO . |

Primary Examiner—James Engel
Attorney, Agent, or Firm—Armstrong, Westerman Hattori, McLeland & Naughton

[57] ABSTRACT

A process for manufacturing a friction plate for a clutch, said friction plate comprised of an annular core having a bonding surface, and a large number of friction material segments adhered to the bonding surface in a circumferential direction of the core with an oil groove provided between every adjacent segments. The process includes the steps of positioning the core with the bonding surface with an adhesive facing upwards; unwinding a friction material tape to a position above the core in an amount corresponding to one friction material segment; subjecting the friction material tape to a cutting to provide the friction material segment, and pressing and adhering the friction material segment to the bonding surface; and unwinding the friction material tape in an amount corresponding to a next friction material segment, and rotating the core for adhering the next friction material segment.

4 Claims, 25 Drawing Sheets

FIG. 10A UNWINDING MEMBER

FIG. 10B SUPPORT

FIG. 10C PRESSING MEMBER (A) (B) (D) (E)

PROCESS AND APPARATUS FOR MANUFACTURING CLUTCH FRICTION PLATE

This is a division of application Ser. No. 07/922,921 filed Sep. 21, 1992.

BACKGROUND OF THE INVENTION

1. Field of the Invention

The present invention relates to a process for manufacturing a friction plate for a clutch, and an apparatus for use in the process.

2. Description of the Prior Art

In manufacturing a friction plate for a clutch, a procedure has been conventionally employed which comprises subjecting a sheet of a friction article to a cutting operation to provide a predetermined sized cut, subjecting the cut to a punching to provide an annular friction article, adhering the annular friction article to an annular core, and subjecting the annular friction article to a machining or to a shaping with a metal mold to provide a large number of radially extending oil grooves on the annular article.

However, if a punching is employed, there is encountered a problem that the yield rate of the friction article is as low as 20 to 40%, resulting in an inferior economy.

When the oil grooves are made by machining, the depth of the groove tends to become shallow in order to avoid a damage to the core. As a result, oil fails to drain in practice, bringing about a reduction in durability due to degradation in cooling performance, a generation of a dragging noise, a lowering in operation feeling and the like. When the oil groove is made by shaping, a mold for each of friction plates having different sizes must be provided, which is extremely uneconomical.

SUMMARY OF THE INVENTION

Accordingly, it is an object of the present invention to provide an economical process for manufacturing a friction plate for a clutch and a manufacturing apparatus for use in such process, wherein the yield rate of a friction article can be increased, and an oil groove can be made in the same depth as the thickness of the friction article.

According to the present invention, there is provided a process for manufacturing a friction plate for a clutch, said friction plate comprised of an annular core having a bonding surface; a large number of friction material arranged and adhered on the bonding surface in a circumferential direction of the core with an oil groove provided between very adjacent segments, said process comprising the steps of: positioning the core with the bonding surface with an adhesive facing upwards; unwinding a friction material tape to a position above the core in an amount corresponding to each of the friction material segments; subjecting the friction material tape to a cutting to provide the friction material segment, and pressing and adhering the friction material segment to the bonding surface of the core; and unwinding the friction material tape in an amount corresponding to the next friction material segment, and rotating the core for adhering the next friction material segment.

With the above-described process, the friction material segments is cut out from the friction material tape and adhered one by one to the core. Therefore, it is possible to increase the yield rate of the friction material and to produce a friction plate with an oil groove of the same depth as the thickness of the friction material provided between the adjacent friction material segments. Further, this process can easily be applied to the manufacture of friction plates of various sizes and therefore, it is very economical, conjointly with the increase in the yield rate.

In addition, according to the present invention, there is provided an apparatus for manufacturing a friction plate for a clutch, said friction plate comprised of an annular core having a bonding surface, a large number of friction material segments arranged and adhered to the bonding surface in a circumferential direction of the core with an oil groove provided between every adjacent segments, said apparatus comprising: a support for positioning the core with the bonding surface with an adhesive facing upwards, said support is intermittently rotated for adhesion of every one of the friction material segments; an unwinding mechanism for intermittently unwinding a friction material tape to a position above the support in an amount corresponding to each of the friction material segments; and a liftable pressing mechanism for subjecting the friction material tape to a cutting and pressing and adhering the resulting friction material segment to the core.

With such apparatus, a friction plate can efficiently be made by reliably repeating the operations of unwinding the friction material tape, subjecting the friction material tape to the cutting so as to provide one friction material segment and pressing and adhering the resulting friction material segment to the core.

Further, according to the present invention there is provided a process for manufacturing a friction plate for a clutch, said friction plate comprised of an annular core having a bonding surface, a large number of friction material segments arranged and adhered to the bonding surface in a circumferential direction of the core with an oil groove provided between every adjacent segments said process comprising the steps of: positioning the core with the bonding surface with an adhesive facing upwards; unwinding a friction material tape having a width corresponding to that of areas equally divided circumferentially on said core, to a position above the core in an amount corresponding to a plurality of friction material segments located in one of said areas; subjecting the friction material tape to a multiple punching to provide a plurality of the friction material segments and pressing and adhering these friction material segments to the bonding surface of the core; and unwinding the friction material tape and rotating the core for the subsequent adhesion of the next friction material segments.

With such manufacturing process, the friction material tape having a particular width is subjected to the multiple punching to provide the plurality of the friction material segments which are then adhered. Therefore, it is possible to increase the yield rate of the friction material and to produce a friction plate with an oil groove of the same depth as the thickness of the friction material between the adjacent friction material segments. Further, this process can easily be applied to the manufacture of friction plates having various sizes and therefore, it is very economical, conjointly with the increase in the yield rate. Yet further, the plurality of friction material segments are adhered in one adhering operation, thereby reducing the number of bonding steps and improving a productivity of the friction plate.

Further, according to the present invention, there is provided an apparatus for manufacturing a clutch friction plate for a clutch, said friction plate comprised of an annular core having a bonding surface, and a large number of friction material segments arranged and adhered to the bonding surface in a circumferential direction of the core with an oil groove provided between every adjacent segments, said apparatus comprising: a support for positioning the core with the bonding surface with an adhesive facing upwards, said support is intermittently rotated for adhesion of every one of the friction material segments; an unwinding mechanism for unwinding a friction material tape, the tape having a width corresponding to that of areas equally divided circumferentially on said core, to a position above the core, in an amount corresponding to a plurality of friction material segments located in one of said areas; and a liftable pressing mechanism for subjecting the friction material tape to a multiple punching to provide a plurality of the friction material segments and pressing and adhering the resulting friction material segments to the core.

With such manufacturing apparatus, a friction plate can efficiently be manufactured by reliably repeating the operations of unwinding the friction material tape, subjecting the friction material tape to the multiple punching so as to simultaneously provide a plurality of friction material segments, and adhering the resulting friction material segments to the core.

Yet further, according to the present invention, there is provided a process for manufacturing a friction plate for a clutch, said friction plate comprised of an annular core having a bonding surface, and a large number of friction material segments arranged and adhered to the bonding surface in a circumferential direction of the core with an oil groove provided between every adjacent segments, said process comprising the steps of: feeding a friction material tape to a position between a receiving roller and a cutting roller having a large number of cutting blades disposed radially at equal distances on an outer peripheral surface thereof, cutting out and retaining each of the friction material segments sequentially from the friction material tape by cooperation of the two adjacent cutting blades of the cutting roller and the receiving roller, pushing out the individual retained friction material segment from a position between the cutting blades, and pressing and adhering the friction material segment onto the bonding surface of the core while rotating the core synchronously with the cutting roller.

With this manufacturing process, the friction material segments are cut off sequentially from the friction material tape and adhered one by one to the core. Therefore, it is possible to increase the yield rate of the friction material and to produce a friction plate with an oil groove of the same depth as the thickness of the friction provided between the adjacent friction material segments. Further, this process can easily be applied to the manufacture of friction plates of various sizes and therefore, it is economical, conjointly with the increase in the yield rate. Yet further, the adhesion of the friction material segments is conducted while rotating the core. Therefore, the adhering operation can efficiently be conducted, and the manufacturing cost for the friction plate can be reduced.

Yet further, according to the present invention, there is provided an apparatus for manufacturing a clutch friction plate for a clutch, said friction plate comprised of an annular core having a bonding surface, and a large number of friction material segments arranged and adhered to the bonding surface in a circumferential direction of the core with an oil groove provided between every adjacent segments, said apparatus comprising: a feed mechanism for feeding a friction material tape to a position between a cutting roller and a receiving roller which are rotated with their outer peripheral surfaces opposed to each other, a support rotating synchronously with the cutting roller and supporting the core with the bonding surface opposed to the outer peripheral surface of the cutting roller, the cutting roller including a large number of cutting blades disposed radially at equal distances on the outer peripheral surface thereof, two adjacent cutting blades of the cutting blades cutting off and retaining each of the friction material segments sequentially from the friction material tape by cooperation with the receiving roller, and a pressing member disposed between the two adjacent cutting blades for reciprocal movement between a retreated position in which it permits the cutting and retaining of the friction material segment and an advanced position in which it pushes out the friction material segment from between the two cutting blades to press it against the bonding surface.

With this apparatus, it is possible to efficiently produce a friction plate by reliably cutting off and retaining the friction material segments and pressing and adhering the friction material segments to the core.

Yet further, according to the present invention, there is provided a process for manufacturing a friction plate for a clutch, said friction plate comprised of an annular core having a bonding surface, and a large number of friction material segments arranged and adhered to the bonding surface in a circumferential direction of the core with an oil groove provided between every adjacent segments, said process comprising the steps of: positioning the core with the bonding surface with an adhesive facing upwards; unwinding a plurality of friction material tapes to a position above the core in an amount corresponding to each of the friction material segments at a plurality of unwind positions arranged at equal distances in a circumferential direction of the core; subjecting each of the friction material tapes to a cutting to provide the friction material segment to the bonding surface of the core; and unwinding each of the friction material tapes in an amount corresponding to the next friction material segments and rotating the core for the adhesion of the next friction material segments.

With this manufacturing process, friction material segments are provided from the plurality of friction material tapes and adhered to the core. Therefore, it is possible to increase the yield rate of friction material and to produce a friction plate with an oil groove of the same depth as the thickness of the friction material provided between the adjacent friction material segments. Further, this process can easily be applied to the manufacture of friction plates of various sizes and thereof, it is very economical, conjointly with the increase in the yield rate. Yet further, the plurality of friction material segments are bonded to the core in one set of pressing and adhering steps and therefore, the operation time for bonding the friction material segments can be shortened and in its turn, the productivity for the clutch friction plate can be improved.

Yet further, according to the present invention, there is provided an apparatus for manufacturing a friction plate for a clutch, said friction plate comprised of an annular core having a bonding surface, and a large number of friction material segments arranged and adhered to the bonding surface in a circumferential direction of the core with an oil groove provided between every adjacent segments, said apparatus comprising: a support for positioning the core with the bonding surface with an adhesive facing upwards and for intermittently rotating for adhesion of every one of the friction material segments; a plurality of unwinding mechanisms for intermittently unwinding a plurality of friction material tapes each in an amount corresponding to the friction material segment to a plurality of unwind positions arranged above the support at equal distances in a circumferential direction of the core, and a plurality of liftable pressing mechanisms for subjecting the friction material tapes to a cutting and pressing and adhering the resulting friction material segments to the core.

With this manufacturing apparatus, a friction plate for a clutch can efficiently be produced by reliably repeating the operations of unwinding the friction material tapes, subjecting the friction material tapes to the cutting to provide the friction material segments, and adhering the resulting friction material segments to the core. The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 and 3 illustrate a friction plate, wherein

FIG. 1 is a plan view of the entire friction plate;

FIGS. 2 and 3 are sectional views taken along lines II—II and III—III in FIG. 1, respectively;

FIGS. 4 to 12 illustrate a first embodiment of the present invention, wherein

FIG. 4 is a perspective view of a manufacturing apparatus;

FIG. 5 is a longitudinal sectional side view of an adhering mechanism for adhering a friction material segment;

FIG. 6 is an illustration for explaining the operation of adhering friction material segments to a core;

FIGS. 7 and 8 are sectional views taken along line VII—VII and VIII—VIII in FIG. 5, respectively;

FIGS. 9A to 9E are views for explaining the operation of a pressing member;

FIG. 10 is a timing chart;

FIG. 11 is a longitudinal sectional side view of an essential portion of a modified adhering mechanism for adhering a friction material segment;

FIG. 12 is an illustration for explaining the operation of adhering friction material segments to a core by the modified adhering mechanism;

FIGS. 13 to 17 illustrate a second embodiment of the present invention, wherein

FIG. 13 is a perspective view of a manufacturing apparatus of the second embodiment;

FIG. 14 is a longitudinal sectional side view of an adhering mechanism for adhering a friction material segment;

FIG. 15 is a view taken along an arrow XV in FIG. 14;

FIG. 16 is an illustration for explaining an operation of adhering friction material segments to a core;

FIG. 17 is a sectional view taken along a line XVII—XVII in FIG. 14;

FIGS. 18 to 25 illustrate a third embodiment of the present invention, wherein

FIG. 18 is a perspective view of a manufacturing apparatus of the third embodiment;

FIG. 19 is a longitudinal sectional side view of a core lifting/rotating mechanism;

FIG. 20 is a plan view illustrating a relation between a support and a core;

FIG. 21 is a longitudinal sectional side view of a first adhering mechanism for adhering a friction material segment;

FIG. 22 is an enlarged view of an essential portion of the mechanism shown in FIG. 21;

FIG. 23 is an enlarged view of an essential portion of a cutting roller;

FIG. 24 is a view for explaining the operation of cutting a friction material segment;

FIG. 25 is a view for explaining the operation or pressing/adhering a friction material segment;

FIGS. 26 to 29 illustrate a fourth embodiment of the present invention, wherein

FIG. 26 is a plan view of a manufacturing apparatus;

FIG. 27 is a longitudinal sectional side view of a first adhering mechanism for adhering a friction material segment;

FIG. 28 is an illustration for explaining an operation of adhering friction material segments to a core; and FIG. 29 is a perspective view of an adhesive applying mechanism.

DESCRIPTION OF THE PREFERRED EMBODIMENTS

Figure 1:
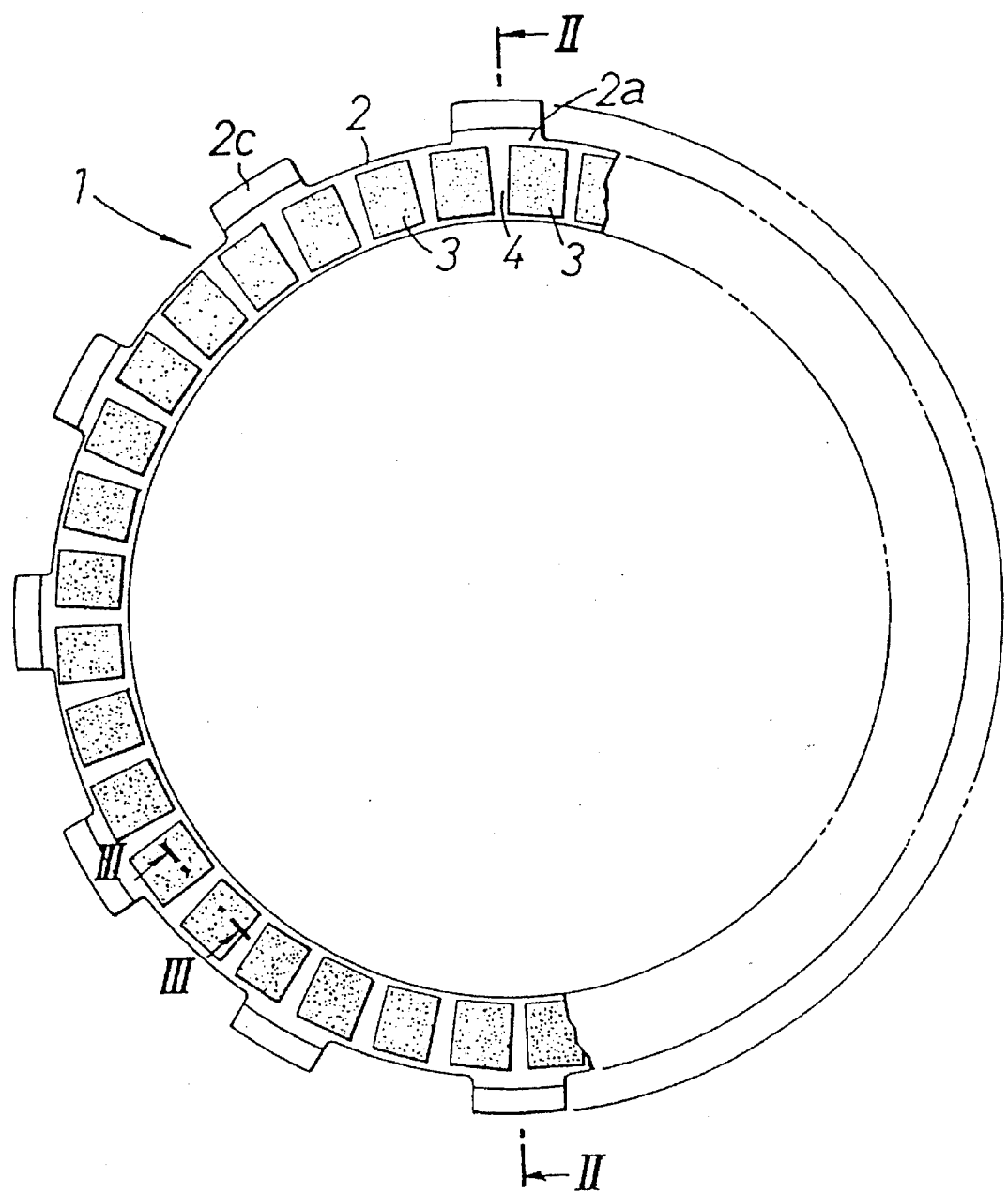
Figure 2:
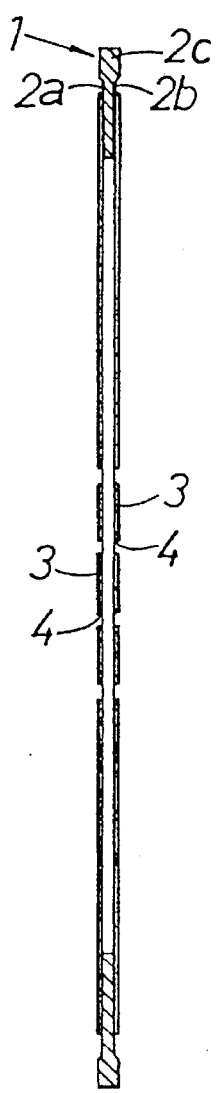
Figure 3:
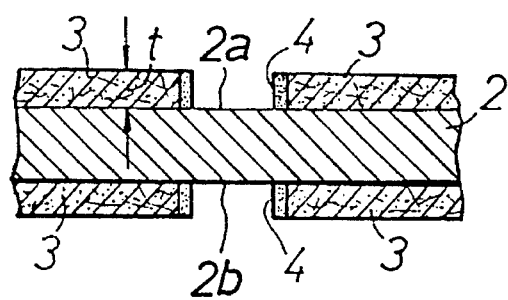

FIGS. 1 to 3 illustrate a clutch friction plate 1. The friction plate 1 is comprised of an annular core 2 and a large number of friction material segments 3 adhered to opposite bonding surfaces 2a and 2b of the core 2 in the circumferential direction thereof. An oil groove 4 is formed between the adjacent friction material segments 3 and has a depth equal to the thickness of the friction material segment 3.

Figure 4:
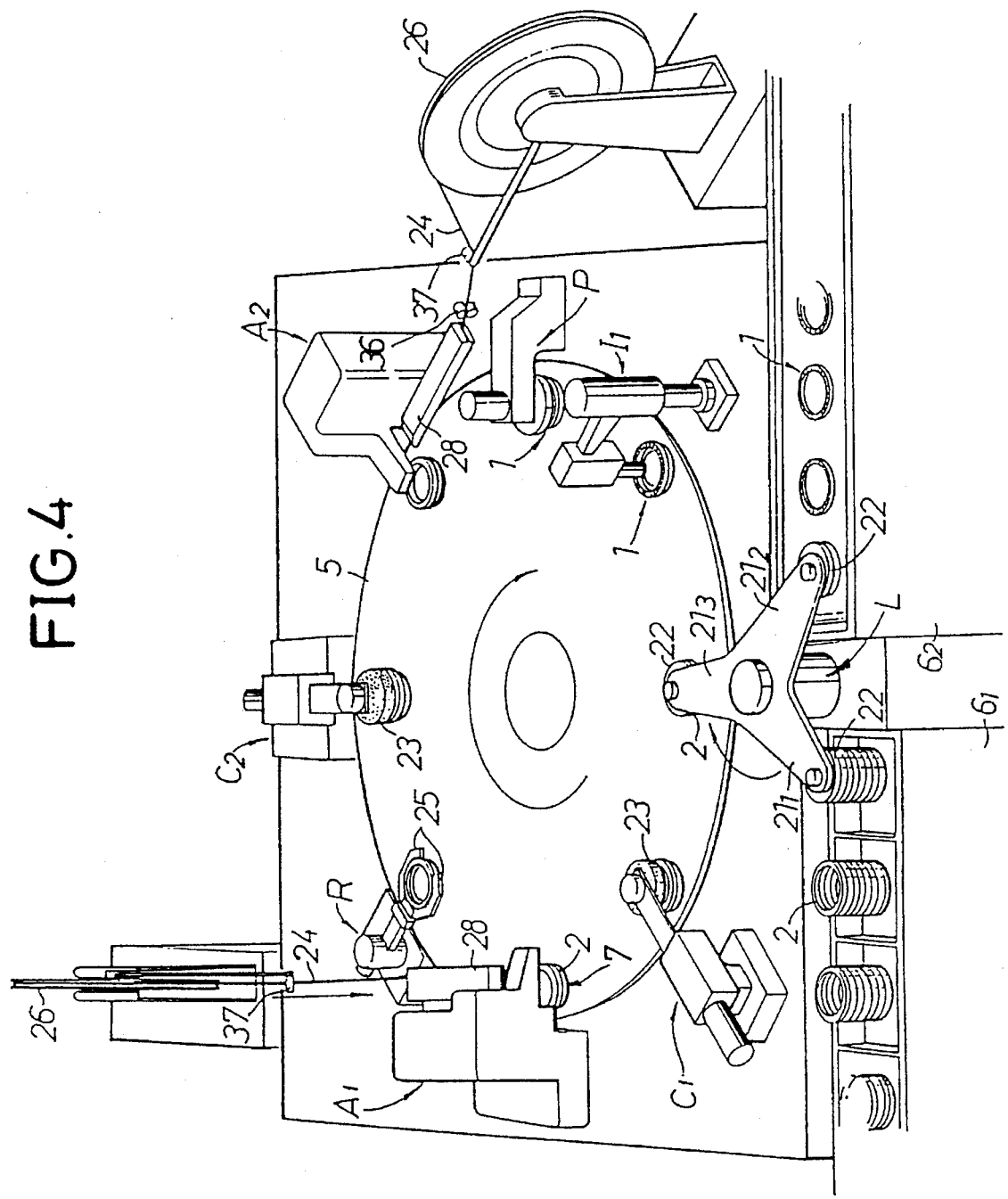

FIG. 4 illustrates an automatic manufacturing apparatus for manufacturing a friction plate 1 of the type described above according to a first embodiment of the present invention. The apparatus comprises a loading and unloading mechanism L for supplying a core and removing a friction plate, a first adhesive applying mechanism $C_1$, a first adhering mechanism $A_1$, a reversing mechanism R, a second adhesive applying mechanism $C_2$, a second adhering mechanism $A_2$, a pressing mechanism P and an inspecting mechanism $I_1$. These mechanisms being sequentially disposed around a turn table 5 at distances of 45°. The turn table 5 is intermittently rotatable for every 45° in a clockwise direction.

A first conveyor $6_1$ for conveying cores and a second conveyor $6_2$ for conveying friction plates, having the same preset transporting direction, are arranged in a tangential direction of the turn table 5 on opposite sides of the loading/unloading mechanism L.

The turn table 5 includes eight core-positioning supports 7 disposed near the outer periphery thereof for every 45° in a circumferential direction. The surroundings of each of the supports 7 are constructed in the following manner.

Figure 5:
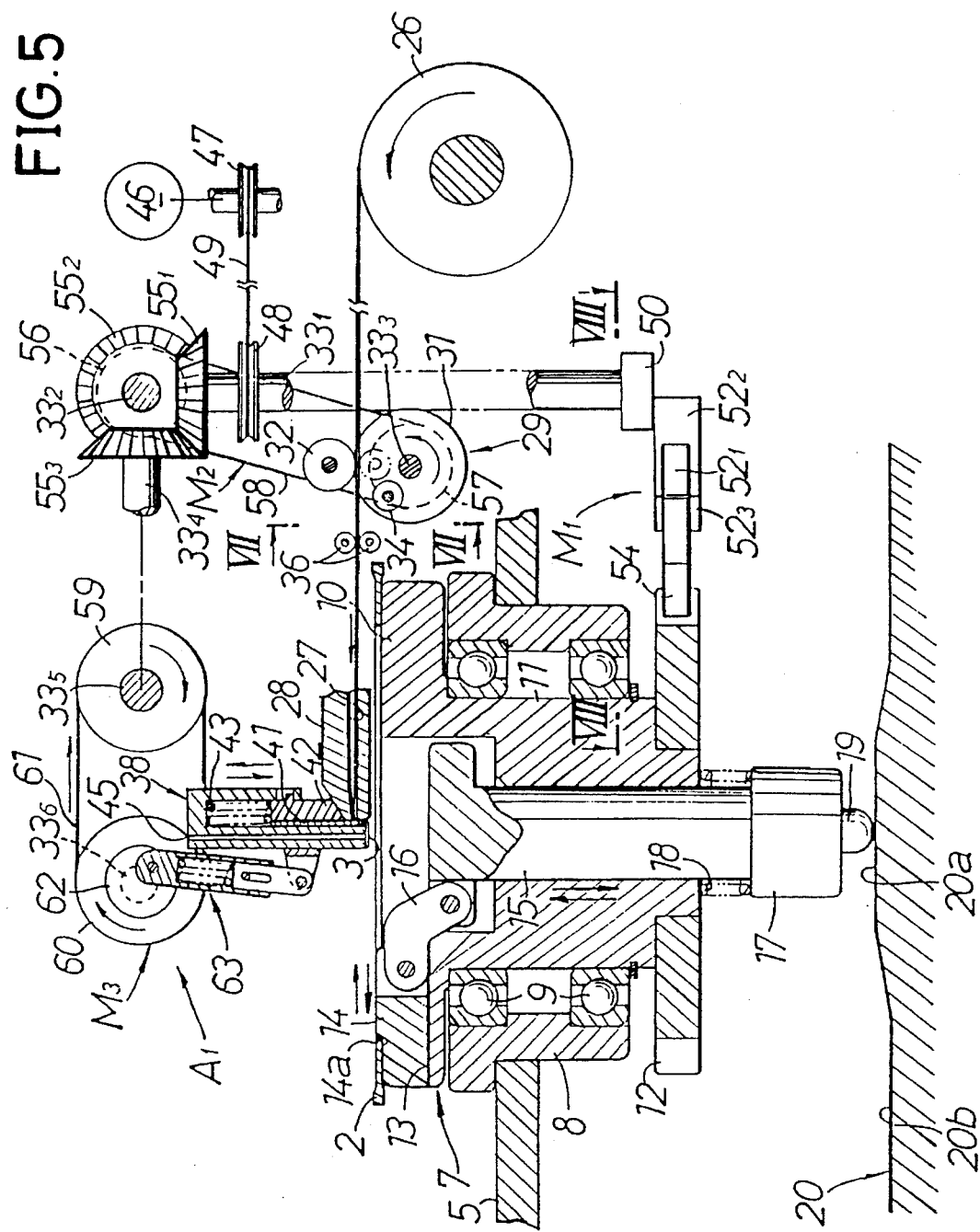

Referring also to FIG. 5 flanged cylindrical retainers 8 are secured to the turn table 5 at the periphery thereof for every 45° in the circumferential direction. The support 7 is rotatably supported on the cylindrical retainer 8 with a bearing 9 interposed therebetween. The support 7 is comprised of an annular rest plate 10 exposing an upper surface on the turn table 5, and a hollow cylinder with its lower end projecting through the retainer 8. A gear 12 is secured to an outer peripheral surface of the hollow cylinder 11 at its lower end for intermittently rotating the support 7.

A plurality of slide grooves 13 formed in the upper surface of the rest plate 10 at distances in a circumferential direction to extend in radial direction of the rest plate 10. A slider 14 is slidably received in each of the slide grooves 13. An operating rod 15 is slidably mounted inside the hollow cylinder 11 for vertical movement in a manner that a tip end thereof is located just below the corresponding slider 14 at an upper vertical position. The tip end of the operating rod 15 and the corresponding slider 14 are interconnected through a link 16.

A spring 18 is compressed between a lower end face of the hollow cylinder 11 and an upper end face of an enlarged portion 17 of the operating rod 15 located below such lower end face. A sliding element 19 projects from a lower end face of the enlarged portion 17 and slides on an upper surface of an annular cam plate 20 which is disposed below the turn table 5 along an outer periphery thereof. The cam plate 20 includes raised portions 20a, and level portions 20b which are skirts to the raised portion. Such level portions 20b are disposed to extend from an intermediate point between the first adhering mechanism $A_1$, and the reversing mechanism R to an intermediate point between the reversing mechanism R and the second adhesive applying mechanism $C_2$, and from an intermediate point between the inspecting mechanism $I_1$, and the loading/unloading mechanism L to an intermediate point between the loading/unloading mechanism L and the first adhesive applying mechanism $C_1$, respectively. The raised portion 20a is disposed between the level portions 20b.

In the upper vertical position of the operating rod 15 in which the sliding element 19 lies on the raised portion 20a of the cam plate 20, each slider 14 slides outwardly radially of the rest plate 10, so that an engage step 14a on an upper surface of the slider 14 is brought into engagement with an inner edge of the core 2 placed on the rest plate 10, thereby positioning the core 2. On the other hand, in a lower vertical position of the operating rod 15 in which the sliding element 19 lies on the level portion 20b of the cam plate 20, each slider 14 slides inwardly radially of the rest plate 10, so that the engage step 4a on the upper surface of the slider 14 is brought out of engagement with the inner edge of the core 2, thereby releasing of the positioning of the core 2.

Referring again to FIG. 4, the loading/unloading mechanism L includes three, first, second and third rotatable octopus arms $21_1$, $21_2$ and $21_3$ liftable and intermittently rotatable for 120° in a clockwise direction as viewed in FIG. 4. Each of the rotatable arms $21_1$, $21_2$ and $21_3$ is provided at its tip end with collet chuck 22. When the collet chuck 22, for example, of the first rotatable arm 21, is located above a terminating end or the first conveyor 6, upon stoppage of the rotation of all the rotatable arms $21_1$, $21_2$ and $21_3$, the collet chuck 22 of the second rotatable arm $21_2$ is located above the support 7 of the turn table 5, while the collet chuck 22 of the third rotatable arm $21_3$ is located above the starting end of the second conveyor $6_2$.

The first and second adhesive applying mechanisms $C_1$ and $C_2$ have the same construction and each includes a disk-like silicone pad 23 for applying adhesive to the core 2. The silicone pad 23 is lowered at a position at which it has been retreated from the turn table 5, whereby the adhesive is applied to the disk-like silicone pad 23. Thereafter, the silicone pad 23 is lifted up, then advanced toward the turn table 5 and lowered, whereby the adhesive is applied to the core 2.

The first and second adhering mechanism $A_1$, and $A_2$ have the same construction, such that friction material segments 3 are cut out one by one from a friction material tape 24 and pressed against and adhered to the bonding surfaces 2a and 2b of the core 2. The details of the mechanisms $A_1$, and $A_2$ will be described hereinafter.

The reversing mechanism R comprises a pair of liftable and rotatable hands 25. The reversing mechanism R functions, after completion of the bonding of the friction material segments 3 to one of the bonding surfaces 2a, to lift and reverse the core 2 by the hands 25, thereby turning the other bonding surface 2b up.

The pressing mechanism P is intended to apply a pressing force simultaneously to all the friction material segments 3 adhered to the opposite bonding surfaces 2a and 2b of the core 2 to insure the reliable adhesion of the friction material segments 3 to the opposite bonding surfaces 2a and 2b of the core 2.

The inspecting mechanism $I_1$ is adapted to photo-electrically detect whether or not a predetermined number of friction material segments 3 are adhered to the opposite bonding surfaces 2a and 2b of the core 2.

A procedure of manufacturing a friction plate 1 by the above-described apparatus will be described below.

Before the start of a manufacturing operation, cores 2 with one bonding surface 2a facing upwards are filed into a cylindrical configuration and transported on the first conveyor $6_1$. The turn table 5 is at a stop. One support 7 is at the position for the loading/unloading mechanism L, and the operating rod 15 is at the lower vertical position. Further, each of the rotatable arms $21_1$, $21_2$, and $21_3$ is at its lifted position.

In the loading/unloading mechanism L, the rotatable arms $21_1$, $21_2$ and $21_3$ are lowered, and the first rotatable arm $21_1$, clamps a piece of core 2 horizontally by the collet chuck 22. Then, the rotatable arms $21_1$, $21_2$ and $21_3$ are lifted and rotated for 120°. When the rotatable arms $21_1$, $21_2$ and $21_3$ are lowered again, the first rotatable arm $21_1$ releases the core 2 from the collet chuck 22, and the rotatable arms $21_1$, $21_2$, and $21_3$ are lifted again. The first, second and third rotatable arms $21_1$, $21_2$ and $21_3$ perform such motions sequentially, thereby placing the core 2, with its bonding surface 2a facing upwards onto the rest plate 10 of the support 7.

The turn table 5 is turned for 45° to transfer the core 2 to the position of the first adhesive applying mechanism $C_1$. During the transfer, the operating rod 15 is moved to the upper vertical position by the cam plate 20 and hence, the core 2 is positioned on the rest plate 10 by each slider 14, and the adhesive is applied to the bonding surface 2a of the core 2 by the first adhesive applying mechanism $C_2$.

The turn table 5 is turned for 45° to transfer the core for the position of the first adhering mechanism $A_1$. Then, the friction material tape 24 is unwound or unrolled to a position above the core 2 in an amount correspond to a piece of friction material segment 3 and subjected to a cutting to provide the friction material segment 3, which is then pressed and adhered to the bonding surface 2a of the core 2.

Thereafter, the friction material tape 24 is unwound in an amount corresponding to the next friction material segment 3, and the core 2 is rotated along with the support 7 for adhering such friction material segment 3.

Figure 6:
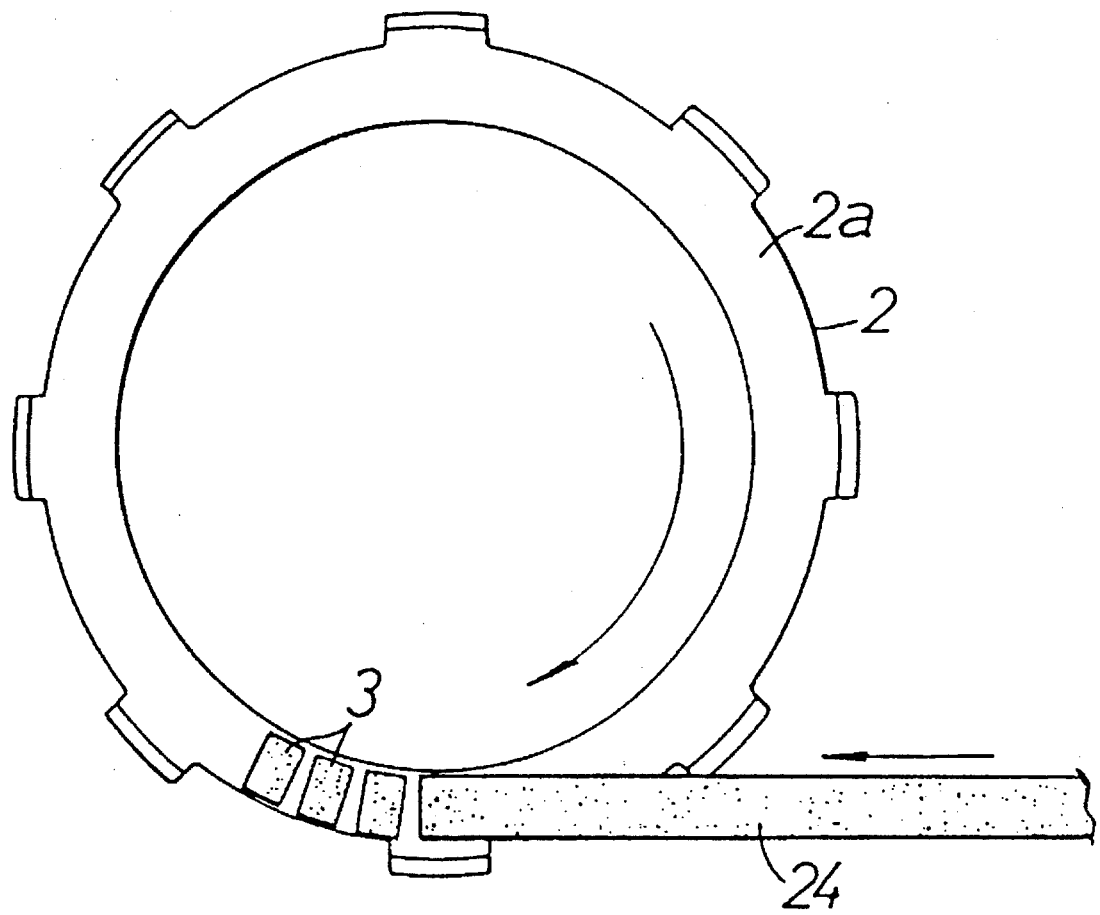

The above-described unwinding, cutting, pressing and adhering and rotating operations are sequentially repeated to adhere a large number of friction material segments 3 one by one to the one bonding surface 2a, as shown in FIG. 6. The bonding operation for the friction material segments 3 will be described below in detail.

The turn table 5 is turned for 45° to transfer the core 2 to the position for the reversing mechanism R. During the transfer, the operating rod 15 is moved to the lower vertical position by the cam plate 20, so that each slide 14 releases the core 2. The core 2 is reversed by the reversing mechanism R to turn the other bonding surface 2b up.

The turn table 5 is turned for 45° to transfer the core for the position of the second adhesive applying mechanism $C_2$. During the transfer, the operating rod 15 is moved to the upper vertical position by the cam plate 20, so that the core 2 is positioned again on the rest plate 10 by each slider 14. Then, the adhesive is applied to another bonding surface 2b of the core 2 by the second adhesive applying mechanism $C_2$.

The turn table 5 is turned for 45° to transfer the core 2 for the position of the second adhering mechanism $A_2$, where a large number of friction material segments 3 are adhered to the bonding surface 2b of the core 2 in the same manner to provide a friction plate 1.

The turn table 5 is turned for 45° to transfer the friction plate 1 to the position for the pressing mechanism P, where a pressing force is applied to all the friction material segments 3 simultaneously to insure the reliable bonding of the friction material segments 3 to the core 2.

The turn table 5 is turned for 45° to transfer the friction plate 1 to the position for the inspecting mechanism $I_1$, where mechanism $I_1$, inspects whether or not a predetermined number of friction material segments 3 are bonded to the core 2.

The turn table 5 is turned for the last 45° to transfer the friction plate 1 to the position for the loading/unloading mechanism L. During the transfer, the operating rod 15 is moved to the lower vertical position by the cam plate 20, so that each slider 14 releases the friction plate 1.

The loading/unloading mechanism L repeats a core supplying operation similar to that described above, seven times, upon every turning movement of the turn table 5 for 45° until the first friction plate 1 reaches the inspecting mechanism $I_1$ which is made from a core 2, being firstly supplied onto the support 7. A push-up mechanism is incorporated in the terminating end of the first conveyor $6_1$ for maintaining the upper most core 2 at the same level, in order to supply the cores 2 one by one.

When the friction plate 1 has been transferred to the position for the loading/unloading mechanism L as described above, for example, the first rotatable arm 21, is located above the support 7. In the loading/unloading mechanism L, the rotatable arms $21_1$, $21_2$, and $21_3$ are lowered, and the first rotatable arm $21_1$, clamps the friction plate 1 on the turn table horizontally by the collet chuck 22, while the second rotatable arm $21_2$, clamps the friction plate 1 on the first transporting conveyor 6, horizontally by the collet chuck 22. Then, the rotatable arms $21_1$, $21_2$ and $21_3$ are lifted and rotated for 120°. When the rotatable arms $21_1$, $21_2$ and $21_3$ are lowered again, the first rotatable arm 21, releases the friction plate 1 from the collet chuck 22, while the core 2 is released from the collet chuck 22 of the second rotatable arm $21_2$, and then, the rotatable arms $21_1$, $21_2$, and $21_3$ are lifted again. Such operations are sequentially conducted, thereby placing the friction plate 1 onto the starting end of the second conveyor $6_2$ and at the same time, placing the core 2 onto the support 7. The friction plate 1 transported by the second conveyor $6_2$ is subjected to a drying treatment for drying the adhesive.

The manufacture of the friction plate 1 is automatically carried out in this manner.

The first and second adhering mechanisms $A_1$ and $A_2$ will be described below. Both the mechanisms $A_1$ and $A_2$ have the same construction, as described above and therefore, only the first adhering mechanism $A_1$ will be described.

Referring to FIGS. 4 and 5, a reel 26 is disposed in the vicinity of the turn table 5 with the friction material wound therearound. The friction material tape 24 is produced by slitting a friction material sheet. A guide mechanism 28 is disposed above the support 7. A through hole 27 is provided in the guide mechanism 28 for permitting a tip end of the friction material tape 24 to pass through. The guide mechanism 28 guides the tip end of the friction material tape 24 to a position above the core 2 positioned on the support 7.

An unwinding mechanism 29 is disposed between the reel 26 and the guide mechanism 28 for intermittently unwinding the friction material tape 24 in an amount corresponding to a piece of friction material segment 3 to a position above the support 7 and thus above the core 2.

Figure 7:
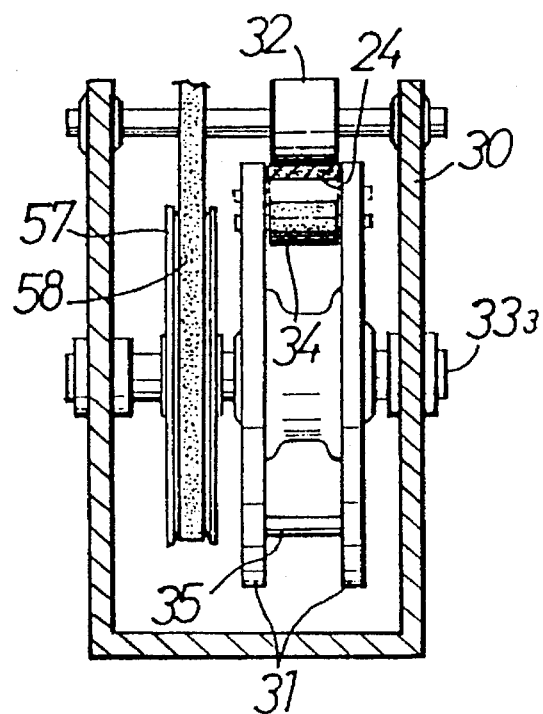

The unwinding mechanism 29 is constructed In one following manner:

As shown in FIGS. 5 and 7, a third rotary shaft $33_3$ is rotatably supported in a frame 30 below the friction material tape 24. A pair of disk-like guide plates 31 are secured to the third rotary shaft $33_3$, the friction material tape 24 is guided between outer peripheries of the guide plates 31.

A press roller 32 is disposed just above the third rotary shaft $33_3$ to come into rolling contact with the friction material tape 24. The axial length of the press roller 32 is set slightly shorter than the distance between the guide plates 31. A small diameter short columnar friction element 34 of a rubber material is non-rotatably disposed at a location offset from the axis of the third rotary shaft $33_3$ between the guide plates 31. Reference numeral 35 is a spacer for the guide plates 31.

In the above-described construction, the friction element 34 circularly revolves about the third rotary shaft $33_3$ below the friction material tape 24. Only when the friction element 34 is brought into close contact with the lower surface of the friction material tape 24, the friction material tape 24 is pulled out or unwound in the above-described manner by cooperation with the press roller 32. Reference numeral 36 designates a guide roller pair, and reference numeral 37 in FIG. 4 designates a tension roller.

A liftable pressing mechanism 38 is disposed in the vicinity of the guide mechanism 28 for cutting out the friction material segment 3 from the friction material tape 24 and pressing and adhering it to the core 2.

Figure 9:
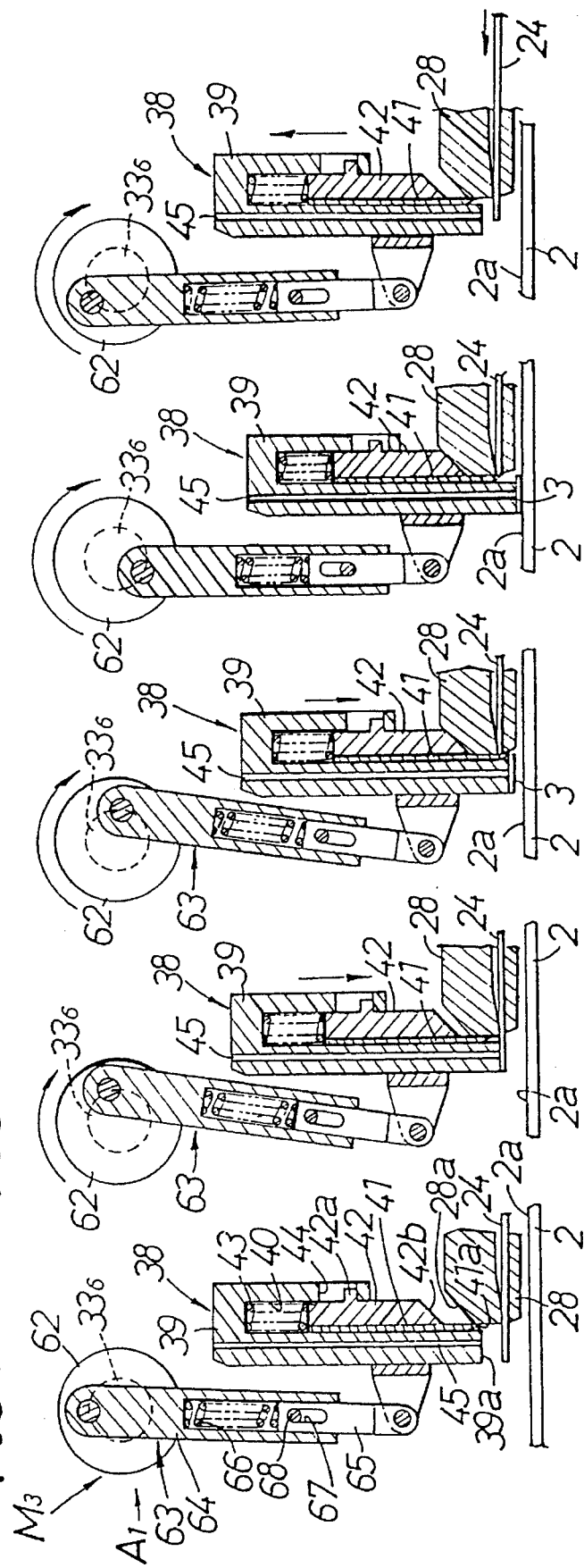

As clearly shown in FIG. 9A, the pressing mechanism 38 comprises a main body 39 which is liftably supported on a guide member (not shown). A lower end face of the main body 39 serves as pressing face 39a. A downward hole 40 is provided in the main body 39 at an upstream of the pressing face 39a in an unwinding direction of the friction material tape 24. A cutting edge 41 adjacent the pressing face 39a and a stopper 42 superposed on and fixed to the cutting edge 41 are slidably received in the downward hole 40.

A spring 43 is compressed between an upper end face of the stopper 42 and a ceiling surface of the downward hole 40. A rejection 42a on a side surface of the stopper 42 abuts against a lower edge of an opening 44 in the main body 39. When the spring 43 exhibits a resilient force before a cutting operation thereby retaining an edge point 41a of the cutting edge 41 on the substantially same level with the pressing face 39a. A slant lower end 42b of the stopper 42 is located above the edge point 41a. The end face 42b abuts against the slant surface 28a of the guide member 28 after the cutting edge 41 has cut the friction material tape 24, thereby preventing the cutting edge 41 from being further lowered.

A sucking hole 45 is provided in the main body 39 and opened at the pressing face 39a of the main body 39, and a vacuum source (not shown) is connected to the sucking hole 45. This ensures that a portion of the friction material tape 24 corresponding to the friction material segment 3 is brought into a close contact with the pressing face 39a prior to the cutting.

A mechanism $M_1$ for intermittently rotating the support 7, a mechanism $M_2$ for operating the unwinding member 29 and a mechanism $M_3$ for lifting the pressing member 38 will be described below.

These mechanisms $M_1$, $M_2$ and $M_3$ are operated by an electric motor 46 which is a common power source. A driving shaft of the electric motor 46 is connected through a reduction unit (not shown) to a driving pulley 47 which is connected through a belt 49 to a follower pulley 48 secured to a first rotary shaft $33_1$.

Figure 8:
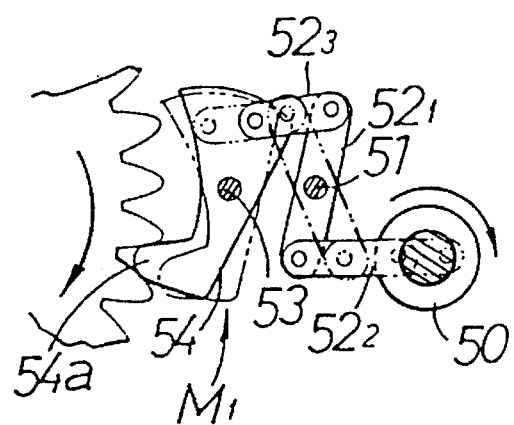

As clearly shown in FIGS. 5 and 8, a disk member 50 is provided at a lower end of the first rotary shaft $33_1$. A first link $52_1$ is pivotally supported at its intermediate portion on a fixed support shaft 51 in the vicinity of the disk member 50. A feeding claw 54 is pivotally supported at its intermediate portion on a fixed support shaft 53 between the first link 52, and the gear 12 of the support 7. An end of the first link $52_1$ is connected to a second link $52_2$ which is connected to the disk member 50 at an eccentric location of the disk member $50_1$, and an end opposite from a claw portion 54a in the feeding claw 54 is connected to the other end of the first link $52_1$ by a third link $52_3$. The number of teeth of the gear 12 is the same as the number of the friction material segments in the friction plate 1.

The first rotary shaft $33_1$, the first, second and third Links $52_1$, $52_2$ and $52_3$, the feeding claw 54 and the gear 12 constitute the mechanism $M_1$ for intermittently rotating the support 7. A half rotation of the first rotary shaft $33_1$ causes the feeding claw 54 to swing from an engaged position shown by a solid line in FIG. 8 in which it is in engagement with the gear 12 to a disengaged position shown by a dashed line, thereby rotating the support 7 for an angle substantially corresponding to one tooth of the gear 12, i.e., a sum of the width of one friction material segment 3 and the width of the groove 4 in the direction of rotation of the support 7. The remaining half rotation of the first rotary shaft 33, causes the feeding claw 54 to swing from the disengaged position shown by the dashed line to the engaged position shown by the solid line, whereby the feeding claw 54 is brought into engagement with the next tooth of the gear 12.

A first bevel gear $55_1$ is secured to an upper end of the first rotary shaft $33_1$, and a second bevel gear $55_2$ is secured to a second rotary shaft $33_2$ for meshing with the first bevel gear $55_1$. A belt 58 is mounted between a pulley 56 secured to the second rotary shaft $33_2$ and a pulley 57 secured to the third rotary shaft $33_3$ of the unwinding member 29.

The second and third rotary shafts $33_2$ and $33_3$ the first and second bevel gears $55_1$ and $55_2$, the pulleys 56 and 57 and the belt 58 constitute the mechanism $M_2$ for operating the unwinding member 29.

A third bevel gear $55_3$ is secured to a fourth rotary shaft $33_4$ and meshed with the first bevel gear $55_1$ and a belt 61 is mounted between pulley 59 secured to a fifth rotary shaft $33_5$ operatively connected to the fourth rotary shaft $33_4$, and a pulley 60 secured to a sixth rotary shaft $33_6$. A disk member 62 is provided at one end of the sixth rotary shaft $33_6$ and an eccentric portion of the disk member 62 and the main body 39 of the pressing member 38 are interconnected through a link mechanism 63. As shown in FIG. 9A, the link mechanism 63 includes a cylindrical member 64 located adjacent the disk member 62 and having a slide bore 64a opened downwardly. A rod member 65 located adjacent the main body 39 is slidably received in the slide bore 64a, and a spring is compressed between a ceiling surface of the slide bore 64a and an upper end face of the rod member 65. A stopper pin 68 is secured to the cylindrical member 64 and protrudes through an axially extending elongated hole 67 in the rod member 65. The stopper pin 68 is in engagement with an inner surface of the elongated hole 67 at its upper portion, except when the friction material segment 3 is pressed and adhered.

The fourth to sixth rotary shafts $33_4$ to $33_6$ the first and third bevel gears $55_1$ and $55_3$, the pulleys 59 and 60, the belt 61 and the link 63 constitute the mechanism $M_3$ for lifting the pressing member 38. The pressing member 38 performs one lifting movement by one rotation of the fifth rotary shaft $33_5$ in a clockwise direction as viewed in FIG. 5.

The position of connection of the disk member 62 and the link mechanism 63 is determined in a manner that the pressing member 38 is further urged, even after the pressing face 39a is in contact with the bonding surface 2a of the core 2 with the friction material segment 3 interposed therebetween upon lowering of the pressing member 38.

The operation of the first adhering mechanism $A_1$ will be described below.

The core 2 is positioned and fixed on the upper surface of the rest 1 of the support 7.

Figure 10:
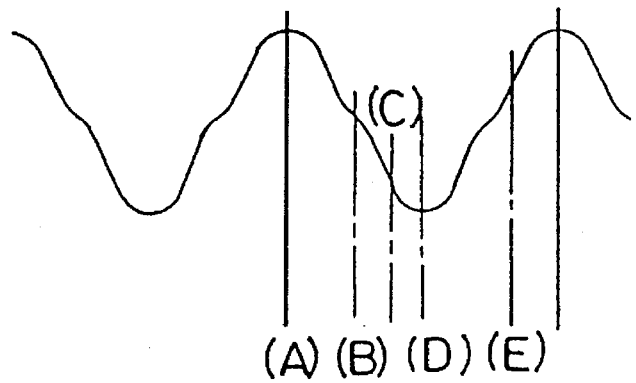

Referring to FIGS. 9A and 10(A), the friction material tape 24 is unwound in an amount corresponding to one friction material segment 3 by the unwinding member 29, and the pressing member 38 is at its lifted position.

In this condition, the feeding claw 54 in the mechanism $M_1$ for intermittently rotating the support 7 has already started the swinging movement from the disengaged position shown by the dashed line in FIG. 8 toward the gear 12. The friction element 34 of the unwinding member 29 is spaced apart from the lower surface of the friction material tape 24.

As shown in FIGS. 9B and 10(B), when the sixth rotary shaft $33_6$ is rotated clockwise, the pressing member 38 starts lowering. When the pressing face 39a abuts against a portion of the friction material tape 24 corresponding to the friction material segment 3, such portion is absorbed to the pressing face 39a by a sucking effect of the sucking hole 45.

As shown in FIGS. 9C and 10(C), the friction material tape 24 is subjected to the cutting operation by the cutting edge 41 as a result of the subsequent lowering movement of the pressing member 38, and the resulting friction material segment 3 is held on the pressing face 30a of the pressing member 38.

As shown in FIGS. 9D and 10(D), the pressing face 39a is placed onto the bonding surface 2a of the core 2 with the friction material segment 3 as a result for the subsequent lowering movement of the pressing member 38. Even after this placement, a force in a direction to lower the pressing member 38 is applied to the pressing member 38, but is absorbed by compression of the spring 66 of the link 63.

This enables a large pressing force to be provided, thereby reliably adhering the friction material segment 3 to the bonding surface 2a of the core 2.

As shown in FIGS. 9E and 10(E), the pressing member 38 is returned to the lifted position as a result of a subsequent rotation of the sixth rotary shaft $33_6$ and in the course of such upward movement, the feeding claw 54 in the mechanism $M_1$ for intermittently rotating the support 7 is brought into engagement with the gear 12 to provide a rotation of the support 7 by an amount corresponding to one tooth. Immediately after the start of the rotation of the support 7, the friction element 34 is put in frictional contact with the lower surface of the friction material tape 24 to unwind the friction material tape 24, which is consequently ready for the next adhesion operation.

Figure 11:
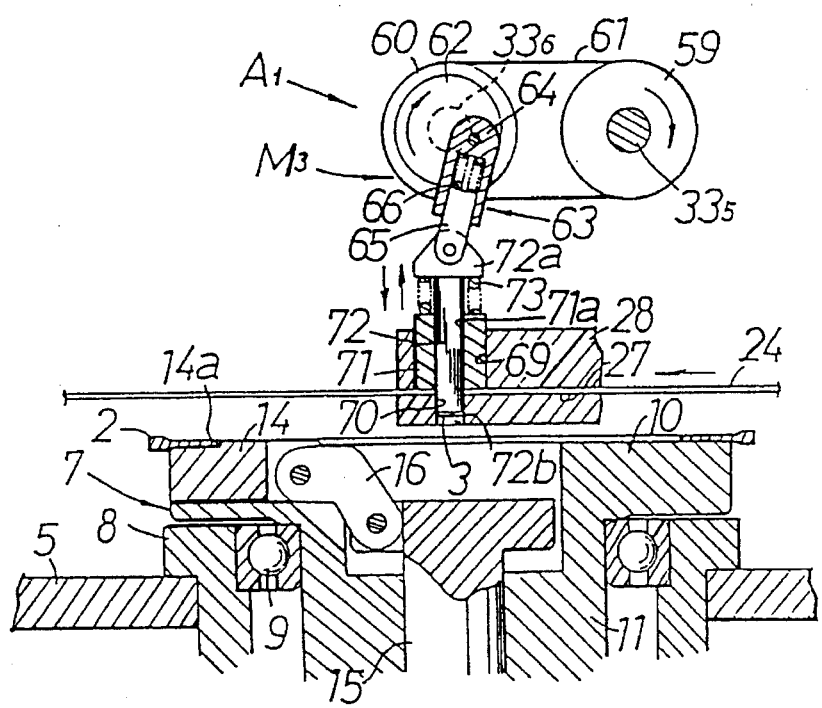
Figure 12:
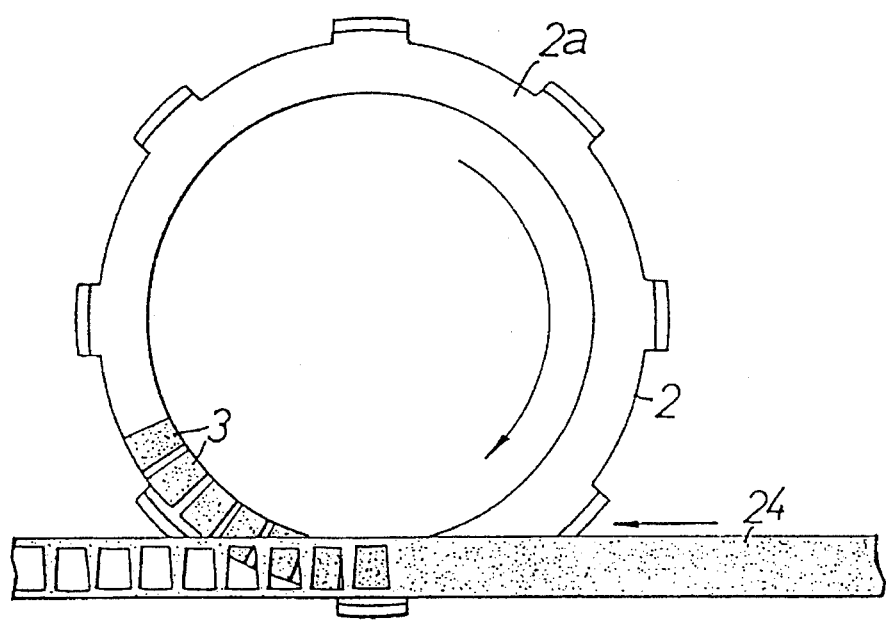
Figure 13:
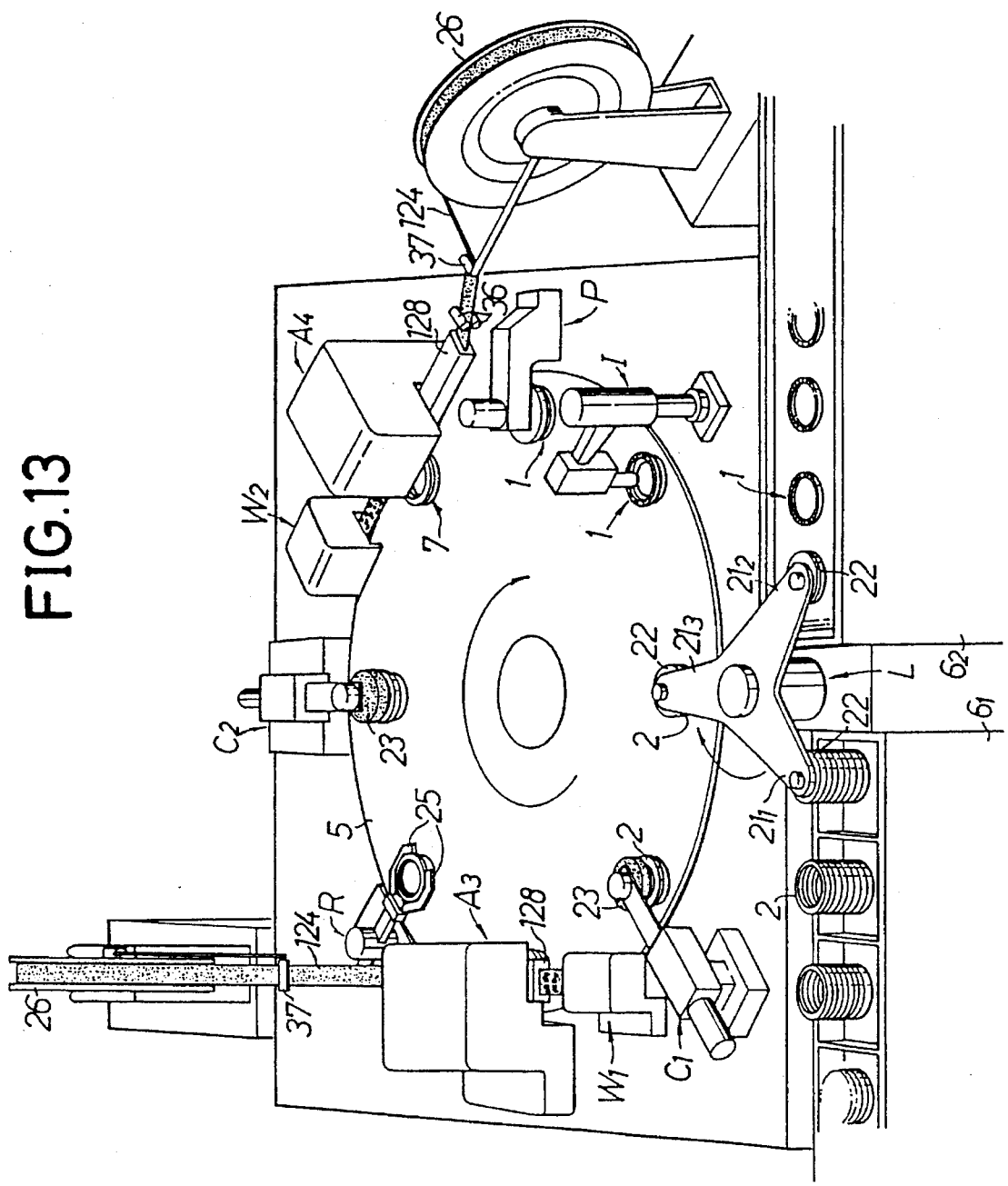

FIGS. 11 and 12 illustrate another embodiment of a friction material segment bonding mechanism. In this embodiment, the friction material segment 3 is cut out from the friction material tape 24 by utilization of a punching process.

More specifically, the guide member 28 is provided with an insertion hole 69 formed for receiving a tape retainer 71 above the through hole 27 through which the tip end of the friction material tape 24 is inserted, and a die hole 70 formed for receiving a punch die 72 below the through hole 27. The tape retainer 71 is slidably received in the insertion hole 69 and has a guide hole 71a aligned with the die hole 70, and the punch die 72 as a pressing member protrudes throughout the guide hole 71a into the die hole 70. A spring 73 is compressed between an enlarged head 72a of the punch die 72 at an upper end thereof and the tape retainer 71.

A mechanism $M_3$ for lifting the punch die 72 is substantially similar to that in the previously described embodiment, but a disk 62 provided on a sixth rotary shaft $33_6$ in this mechanism $M_3$ is connected with the enlarged head 72a of the punch die 72 by a link 63.

When adhering the friction material segment 3, the punch die 72 is lowered to allow the tape retainer 71 to urge the friction material tape 24. Then, the friction material segment 3 is punched by the punch die 72 and subsequently pressed against and adhered to the bonding surface 2a of the core 2 by a lower end face, i.e., a pressing face 72b of the punch die 72.

An apparatus for automatically manufacturing a friction plate according to a second embodiment of the present invention will now be described in connection with the FIGS. 13 to 17, wherein pans or components corresponding to those in the first embodiment are designated by like reference characters, and the description of them is omitted.

First and second adhering mechanisms $A_3$ and $A_4$ in the second embodiment have the same construction, such that a friction material tape 124 having a width corresponding to a plurality of, e.g. nine friction material segments 3 located in one of the areas, e.g., four areas (in the illustrated embodiment) equally divided circumferentially on a core 2, is subjected to a multiple punching operation to provide nine friction material segments 3 which are then pressed against and adhered to the bonding surface 2a of the core 2. In the vicinity of the first and second adhering mechanisms $A_3$ and $A_4$, first and second winders $W_1$, and $W_2$ are disposed to reel up a waste material remaining after the multiple punching operation.

In order to correspond to the construction of the first and second adhering mechanisms A3 and A4, a support 7 in this embodiment is supported on a turn table 5 to rotate for every 90°. More specifically, as shown in detail in FIG. 14, an electric motor m is mounted on an underside of the turn table 5 in the vicinity of a retaining cylinder 8, and a toothed timing belt b is mounted around a driving gear $G_1$ secured to a driving shaft 112 of the electric motor m and a follower gear $G_2$ secured to an outer peripheral surface of a hollow cylinder 11 at its lower end. The electric motor m is intermittently operated in an adhering operation for the friction material segments 3 to rotate the support 7 for every 90° in a counterclockwise direction as viewed in FIG. 16.

The first and second adhering mechanisms $A_3$ and $A_4$ will be described below. Since the mechanisms $A_3$ and A4 have the same construction, only the first adhering mechanism $A_3$ will be described.

Figure 14:
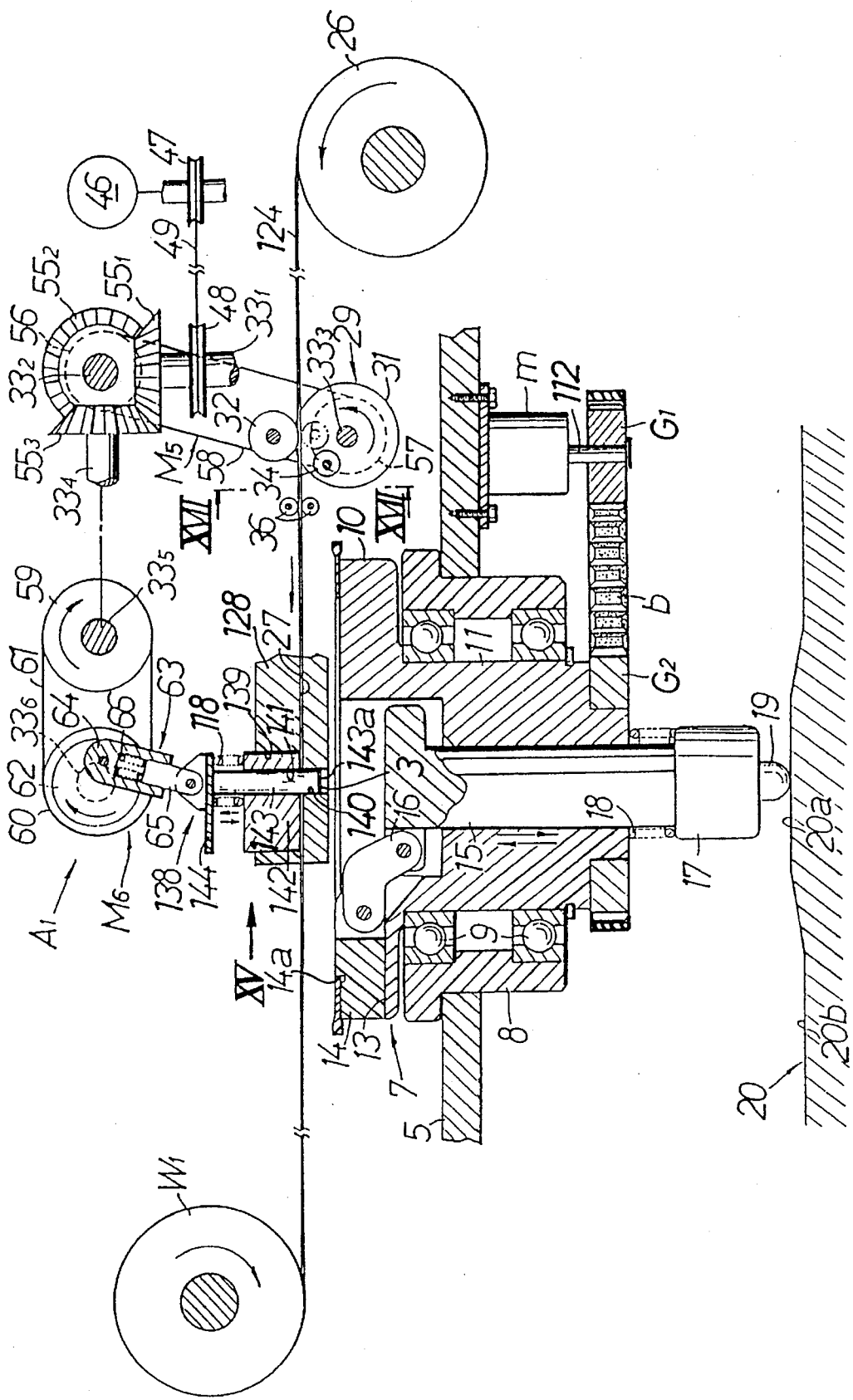
Figure 15:
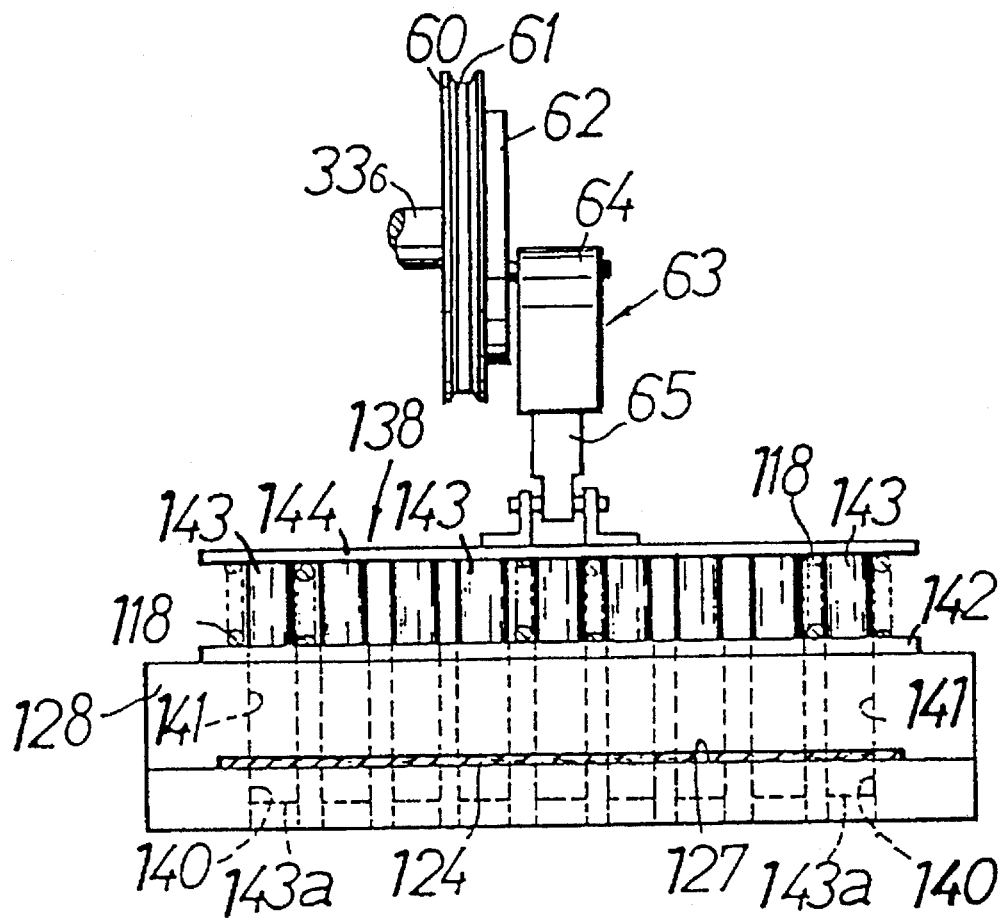

As clearly shown in FIGS. 14 and 15, provided in the vicinity of a guide mechanism 128 is a liftable pressing mechanism 138 functioning a multiple punching for punching nine friction material segments 3 out of the friction material tape 124 and subsequently pressing and adhering them to the core 2.

More specifically, the guide mechanism 128 is provided with an insertion hole 139 for a tape retainer 142 above a through hole 127 through which the friction material tape 124 is inserted, and nine die holes 140 for nine punch dies 143 below the through hole 127. The die holes 140 are arranged in a circumferential direction of the core 2. The tape retainer 142 is slidably received in the insertion hole 139 and has guide holes 141 aligned with the die holes 140. The pressing mechanism 138 comprises nine punch dies 143 which protrude through the guide holes 141 into the corresponding die holes 140, and a connecting plate 144 which connects upper ends of the punch dies 143 to one another. A spring 118 is compressed between the connecting plate 144 and the tape retainer 142.

When adhering the friction material segments 3, the pressing mechanism 138 is lowered to press the friction material tape 124 by the tape retainer 142, and then, the nine friction material segments 3 are punched by all the punches 143. Each of the friction material segments 3 is pressed against and adhered to the bonding surface 2a of the core 2 by the pressing face 143a of each of the punches 143 at a lower end thereof.

Thereafter, the electric motor m is operated to rotate the support 7 for 90° through the driving gear G., the belt b and the follower gear $G_2$ thereby effecting a multiple punching operation similar to that described above and a subsequent pressing operation. In this case, the number of intermittent rotations of the support 7 is three per one surface of the core 2.

Figure 17:
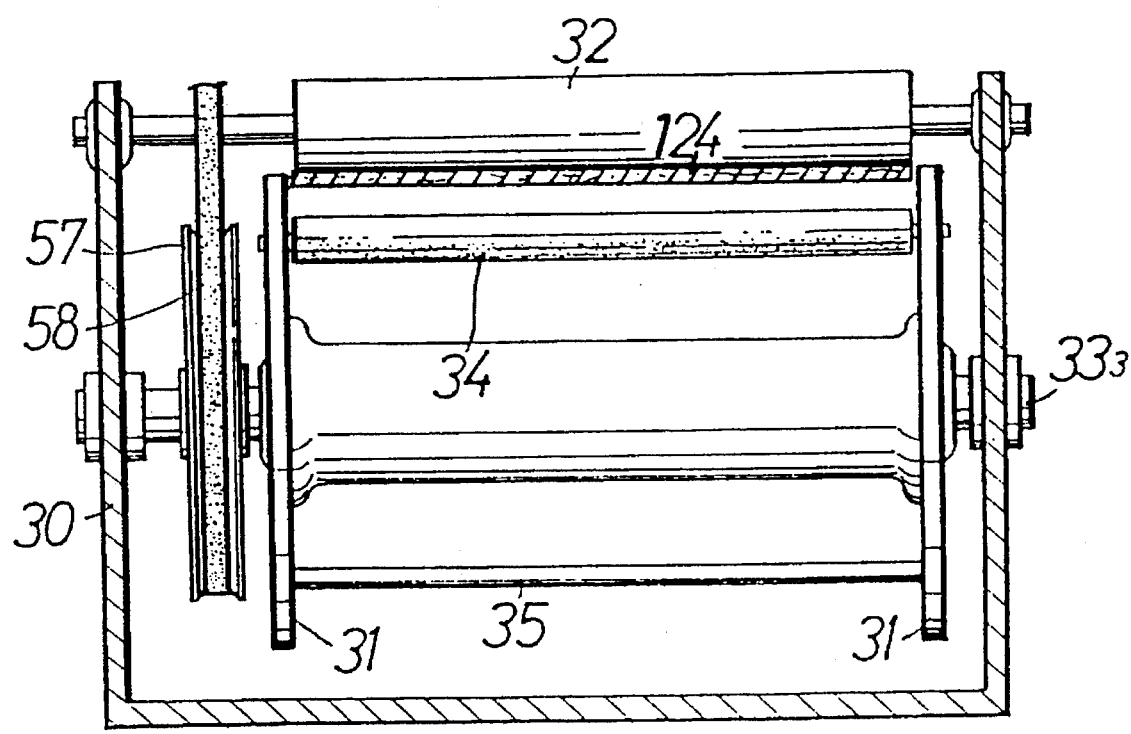

The unwinding mechanism 29 has a construction similar to that in the first embodiment, except that it is formed wider than that in the first embodiment in correspondence to the width of the friction material tape 124, as shown in FIG. 17.

A mechanism $M_4$ for operating the unwinding mechanism 29 and a mechanism $M_5$ for lifting the pressing mechanism 138 have the same constructions as the operating mechanism $M_2$ and the lifting mechanism $M_3$ in the first embodiment, respectively and hence, like parts or components are designated by like reference characters and the description of them is omitted.

Figure 16:
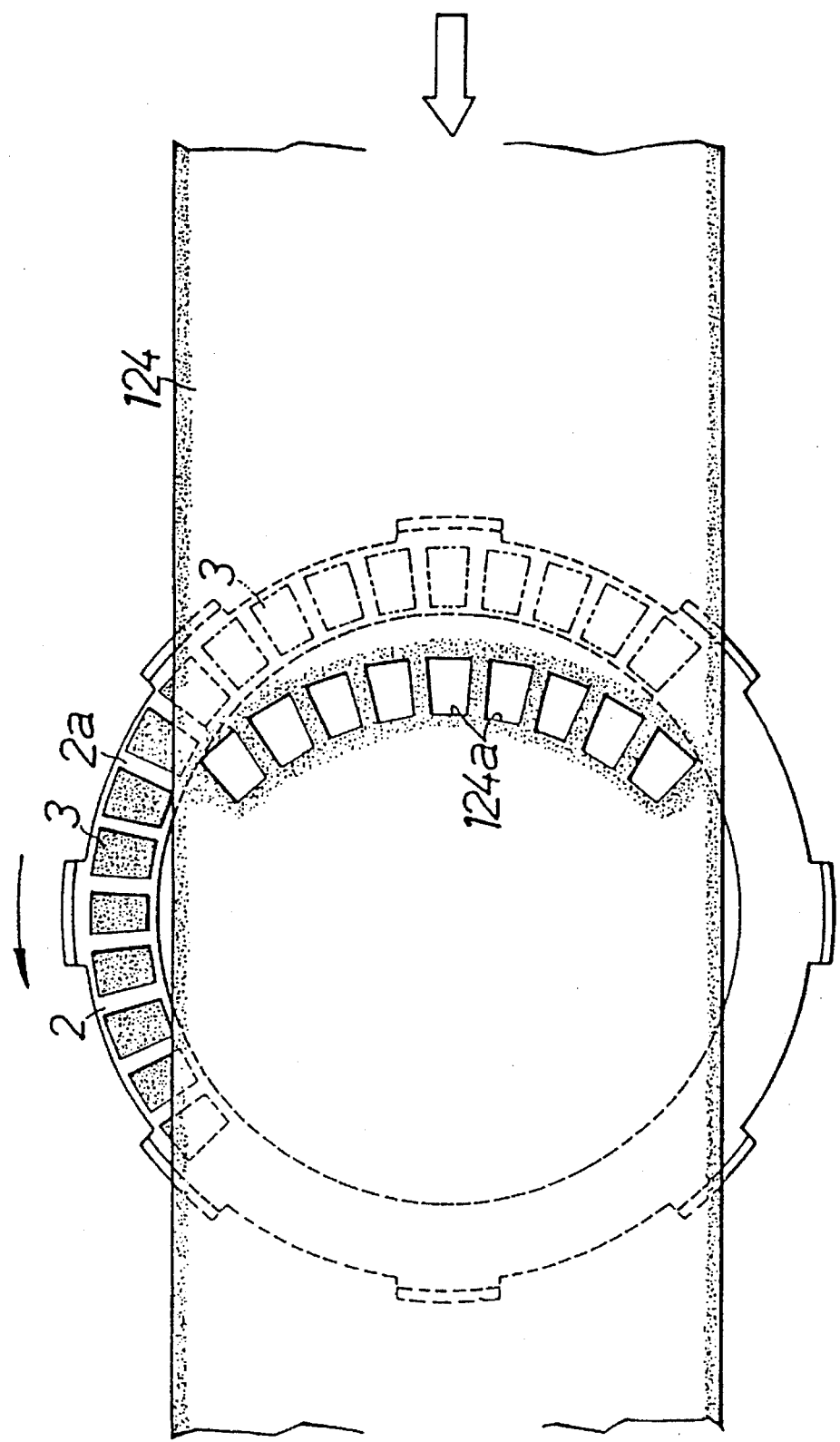

By the mechanisms $M_4$ and $M_5$, the core 2 is transferred to the position of the first friction material segment adhesively-bonding mechanism $A_3$ and then, the friction material tape 124 is unwound in an amount required for one multiple punching operation above the core 2, as shown in FIG. 16 and is subjected to the multiple punching operation to provide nine friction material segments 3 which are then pressed against and adhesively bonded to the bonding surface 2a of the core 2. Reference character denotes a punched hole.

Thereafter, for the subsequent friction material segment adhering operation, the friction material tape 124 is unwound, and the core 2 is rotated for 90° along with the support 7.

The above-described unwinding, multiple punching, pressing/adhering, and rotating operations are repeated sequentially to bond thirty-six friction material segments to the one bonding surface 2a in four groups of nine. A waste of material resulting from punching of the friction material segments from the friction material tape 124 is wound around the first winder $W_1$.

It should be noted that in order to increase the yield rate of the friction material tape 124, the number of friction material segments 3 punched off by the multiple punching operation and the number of intermittent rotations of the support 7 may be properly varied depending upon the magnitude of the diameter of the core 2.

An apparatus for automatically manufacturing a friction plate according to a third embodiment of the present invention will now be described in connection with FIGS. 18 to 25, wherein parts or components corresponding to those in the previously-described embodiment are designated by like reference characters.

Figure 18:
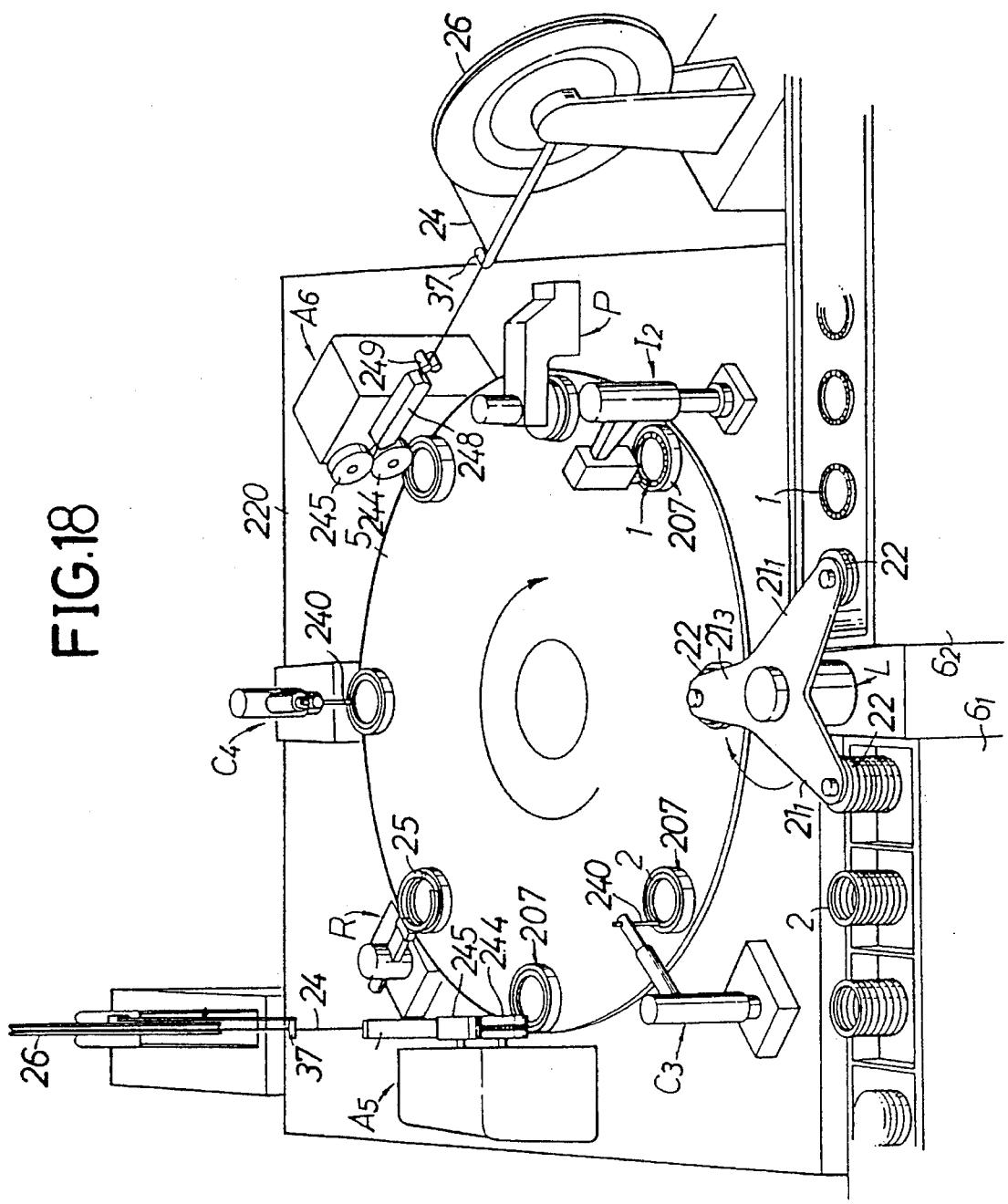

FIG. 18 illustrates the apparatus for automatically manufacturing a friction plate 1. The apparatus comprises a loading/unloading mechanism L for supplying a core and removing a friction plate, a first adhesive applying mechanism $C_3$, a first adhering mechanism $A_5$, a reversing mechanism R, a second adhesive applying mechanism $C_4$, a second adhering mechanism $A_6$, a pressing mechanism P and an inspecting mechanism 12. These mechanisms are disposed sequentially around a turn table 5 intermittently rotatable for every 45° in a clockwise direction at distances of 45°.

A first conveyor $6_1$ for conveying cores and a second conveyor $6_2$ for conveying friction plate, having the same preset transporting direction, are arranged in a tangential direction of the urn table 5 on opposite sides of the loading/unloading mechanism L.

Figure 19:
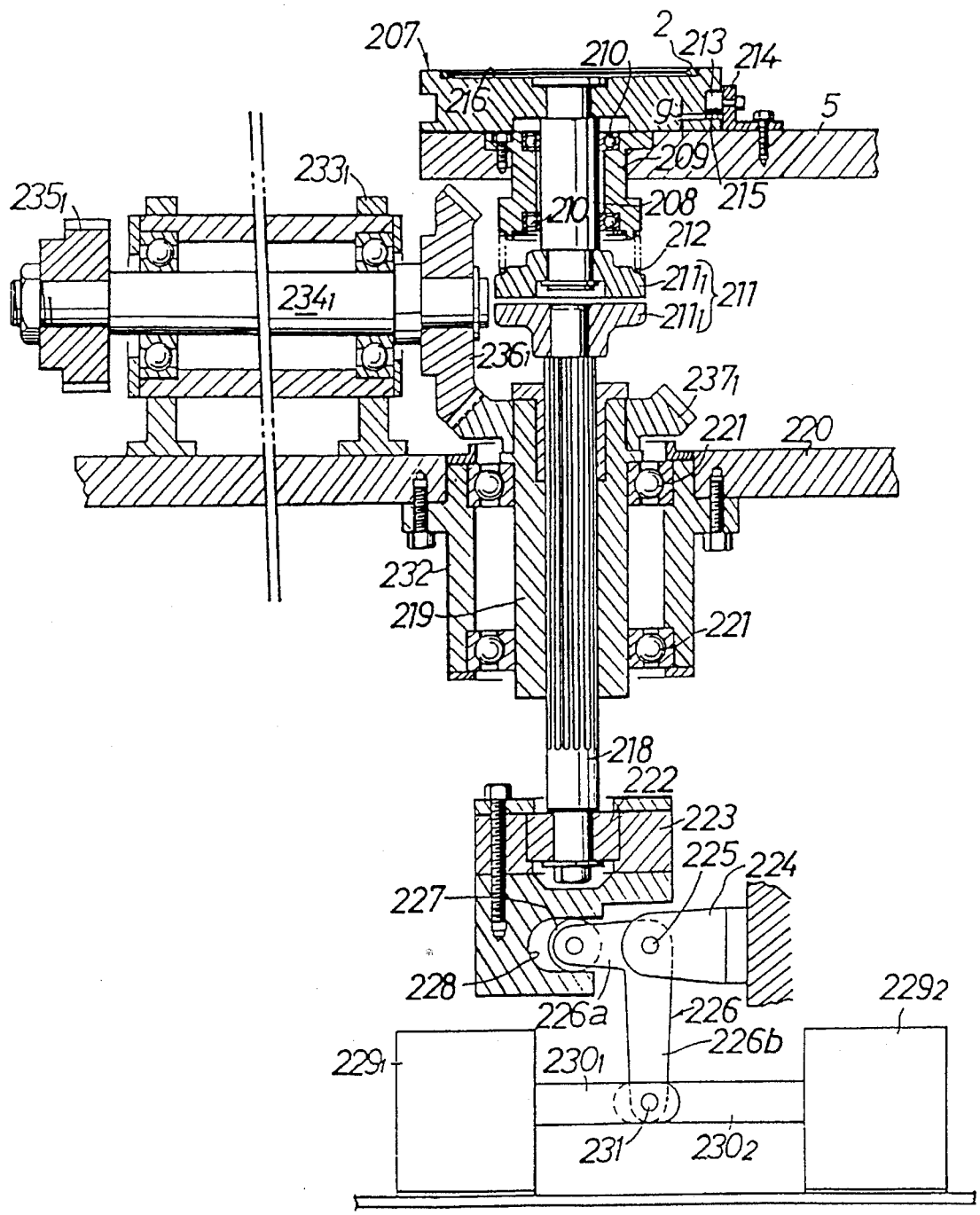

As shown in FIGS. 18 and 19, the turn table 5 comprises eight core-positioning supports 207 disposed on an outer periphery thereof for every 45° in a circumferential direction. The supports 207 have the same construction in which a support shaft 208 projecting from a lower surface thereof is rotatably supported through a bearing 210 in a retaining cylinder 209 which is secured to the turn table 5 to protrude therethrough. A half 211, constituting a friction clutch 211 is secured to a lower end of the support shaft 208 projecting from a lower end face of the retaining cylinder 209, and a spring 212 is compressed between an upper surface of the half 211, and a lower surface of the retaining cylinder 209.

A plurality of rollers 213 are disposed on an upper surface of the turn table 5 around the support 207 through a support member 214. Each of the rollers 213 is loosely fitted in an annular groove 215 in an outer peripheral surface of the support 207. In a condition in which the support 207 is fixed relative to the turn table 5 with its lower surface in contact with the upper surface of the turn table 5 by a resilient force of the spring 212, each roller 213 abuts against an inner surface of the annular groove 215 at its upper portion, with a predetermined gap g left between the inner surface at a lower portion of the annular groove 215 and each roller 213.

The support 207 includes a recess 216 opened upwardly and adapted to be fitted by the core 2. Two pairs of projections 217 are formed on the support 207 at opposed locations around an inner peripheral surface of the recess 216 so as to constitute engage recesses 217a which are engageable by two of a plurality of engage protrusions 2c provided on the outer peripheral surface of the core 2. Such engagement between the recesses 217a and the two protrusions 2c ensures the core 2 to be positioned relative to the support 207.

Below the turn table 5, a lifting and rotating mechanism is provided for lifting and rotating the support 207 at each of positions at which the first and second adhesive applying mechanisms $C_3$ and $C_4$, the first and second adhering mechanism $A_5$ and $A_6$ and the inspecting mechanism $I_2$, useful in applying the adhesive adhering and inspecting of these mechanisms.

This lifting/rotating mechanism is constructed in the following manner:

A splined shaft 218 is provided at an upper end thereof with a half $211_2$ constituting the friction clutch 211. The half $211_2$ is opposed to the half $211_1$ of the support 207. A splined cylinder 219 meshed with the splined shaft 218 is supported in a support cylinder 232 fixed to the support plate 220 with a bearing 221 interposed therebetween. A roller 222 is secured to a lower end of the splined shaft 218 projecting downwardly from the splined cylinder 219. A transmitting member 223 is attached to the roller 222 in such a manner to permit the rotation of the roller 222. A bell-crank 226 is swingably supported on a stationary bracket 224 through a support shaft 225 in the vicinity of the transmitting member 223. A roller 227 is mounted on a tip end of a horizontal arm 226a of the bell-crank 226 to engage a notch-like engage groove 228 open sideways in the transmitting member 223. The bell-crank 226 has a vertical arm 226b which is connected at its lower end to tips or tip ends of opposed operating elements $230_1$, and $230_2$ of a solenoid $229_1$ for lifting and a solenoid $229_2$ for lowering through a common pin 231.

Thus, when the solenoid $229_1$ for lifting is activated to attract the operating element $230_1$, the bell-crank 226 is swung in a clockwise direction as viewed in FIG. 19 about the support shaft 225 to lift the splined shaft 218 causing the halves $211_2$, and $211_2$ to abut against each other. Then, the support 207 is lifted up in an amount corresponding to the gap g against a force of the spring 212, causing the inner surface of the annular groove at its lower portion to contact with each corresponding roller 213, thereby retaining the core 2 at a predetermined height with respect to the adhesive applying mechanisms $C_3$ and $C_4$, the adhering mechanisms $A_5$ and $A_6$ and the inspecting mechanism $I_2$. The swinging movement of the bell-crank 226 is accepted by plays of the operating elements $230_1$ and $230_2$ relative to bodies of the solenoids.

A support frame 233t stands on an upper surface of the support plate 220 in the vicinity of the support cylinder 232. A driving gear $235_1$ is secured to one end of a driving shaft $234_1$ rotatably supported at the support frame $233_1$ and is adapted to receive a power from the electric motor, and a transmitting bevel gear $236_1$ is secured to the other end of the driving shaft $234_1$. The transmitting bevel gear $236_1$ is meshed with a follower bevel gear $237_1$ which is secured to an outer peripheral surface of the splined cylinder 219 at its upper end.

This ensures that when the follower bevel gear $237_1$ is rotated in a condition in which the halves $211_1$, and $211_2$ are in contact with each other to achieve an engagement of the friction clutch 211, the splined cylinder 219 and the splined shaft 218, and thus the support 207 and the core 2 are rotated. The rotation of the support 207 is conducted smoothly in a horizontal plane by rolling of the rollers 213.

As shown in FIG. 18, the loading/unloading mechanism L includes three first, second and third rotatable octopus arms $21_1$, $21_2$ and $21_3$ which are liftable and intermittently rotatable for every 120° in a clockwise direction. Each of the rotatable arms $21_1$, $21_2$ and $21_3$ is provided at its tip end with a collet chuck 22 which is engageable with an inner peripheral surface of the core 2. When the collet chuck 22, for example, of the first rotatable arm $21_1$ is located above the terminating end of the first conveyor $6_1$ during stoppage of the rotation of all the rotatable arms $21_1$, $21_2$ and $21_3$, the collet chuck 22 of the second rotatable arm $21_2$ is located above the support 207 on the turn table 5, and the collet chuck 22 of the third rotatable arm $21_3$ is located above the starting end of the second conveyor $6_2$.

The first and second adhesive applying mechanisms $C_3$ and $C_4$ have the same construction, and a given amount of adhesive is discharged through a discharge nozzle 240 and applied to the bonding surfaces $2a$ and $2b$ of the core 2.

The first and second adhering mechanisms $A_5$ and $A_6$ have the same construction. Friction material segments 3 are cut out one by one from a friction material tape 24, for example, by a cutting roller which will be described hereinafter; retained by the cutting roller and subsequently pressed against and adhered to the bonding surfaces $2a$ and $2b$ of the core 2 which is being rotated synchronously with the cutting roller. The details of the mechanisms $A_1$ and $A_2$ will be described hereinafter.

The reversing mechanism R comprises a pair of liftable and rotatable hands 25. The reversing mechanism R functions, after completion of the bonding of the friction material segments 3 to one of the bonding surfaces $2a$, to lift and reverse the core 2 by the hands 25, thereby turning the other bonding surface $2b$ up.

The pressing mechanism P is intended to apply a pressing force simultaneously to all the friction material segments 3 adhered to the opposite bonding surfaces $2a$ and $2b$ of the core 2 to insure the reliable adhesion of the friction material segments 3 to the opposite bonding surfaces $2a$ and $2b$ of the core 2.

The inspecting mechanism $I_2$ is adapted to photo-electrically detect whether or not a predetermined number of friction material segments 3 are bonded to the opposite bonding surfaces $2a$ and $2b$ of the core 2. This inspecting operation is conducted while rotating the core The manufacturing operation of the friction plate 1 by the above described apparatus will now be explained.

Before the start of the manufacturing operation, the cores 2 with the one bonding surface $2a$ facing upwards are piled one on another and transported by the first conveyor $6_1$. At this time, the turn table 5 is at a stop, and one support 7 is in a position corresponding to the position at which the loading/unloading mechanism is disposed and each of the rotatable arms $21_1$, $21_2$ and $21_3$ is in its lifted position.

In the loading/unloading mechanism L, the rotatable arms $21_1$, $21_2$ and $21_3$ are lowered, and a piece of core 2 is grasped horizontally by the collet chuck 22 of the first rotatable arm $21_1$. Then, the rotatable arms $21_1$, $21_2$ and $21_3$ lifted and rotated for 120°. When the rotatable arms $21_1$, $21_2$ and $21_3$ are lowered again, the first rotatable arm $21_1$ releases the core 2 from the collet chuck 22, and the rotatable arms $21_1$, $21_2$ and $21_3$ are lifted again. The first, second and third rotatable arms $21_1$, $21_2$ and $21_3$ perform such motions sequentially, thereby placing the core 2, with its bonding surface $2a$ facing upwards, to the recess 216 of the support 207, thus positioning the core 2.

The turn table 5 is turned for 45° to transfer the core 2 to the position at which the first adhesive applying mechanism $C_1$ is disposed. The solenoid $229_1$ for lifting is activated, causing the splined shaft 218 to rise to bring the friction clutch 211 into engagement, while causing the support 207 to rise, and further, the splined shaft 218 and thus the support 207 is rotated through the driving gear $235_1$ and the like. Then, an adhesive is applied to the bonding surface $2a$ of the core 2 by the first adhesive applying mechanism $C_3$.

The solenoid $229_2$ for lowering is activated, causing the splined shaft 218 to bring the friction clutch 211 out of engagement, while permitting the support 207 to lower by a resilient force of the spring 212.

Figure 20:
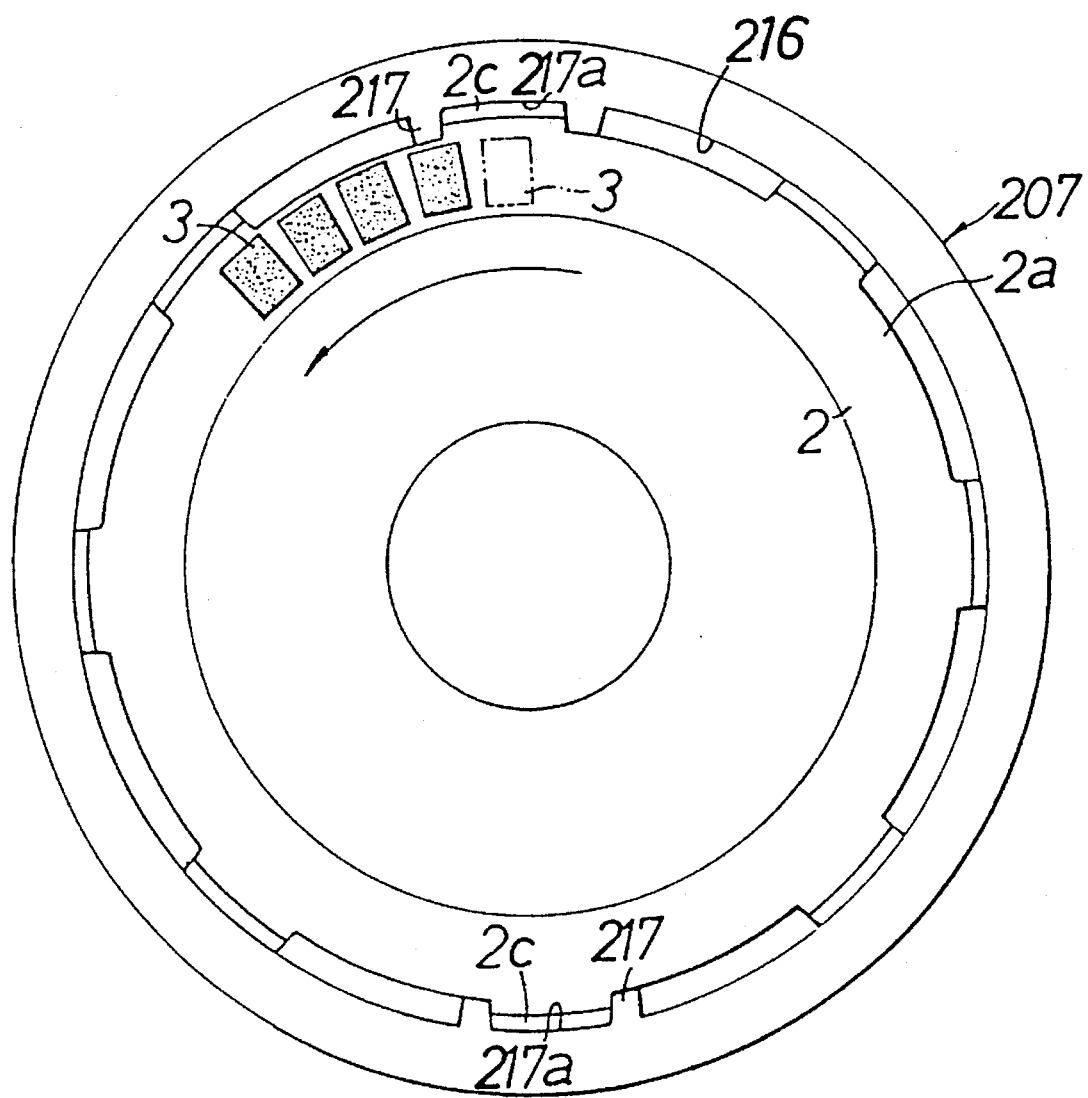
Figure 21:
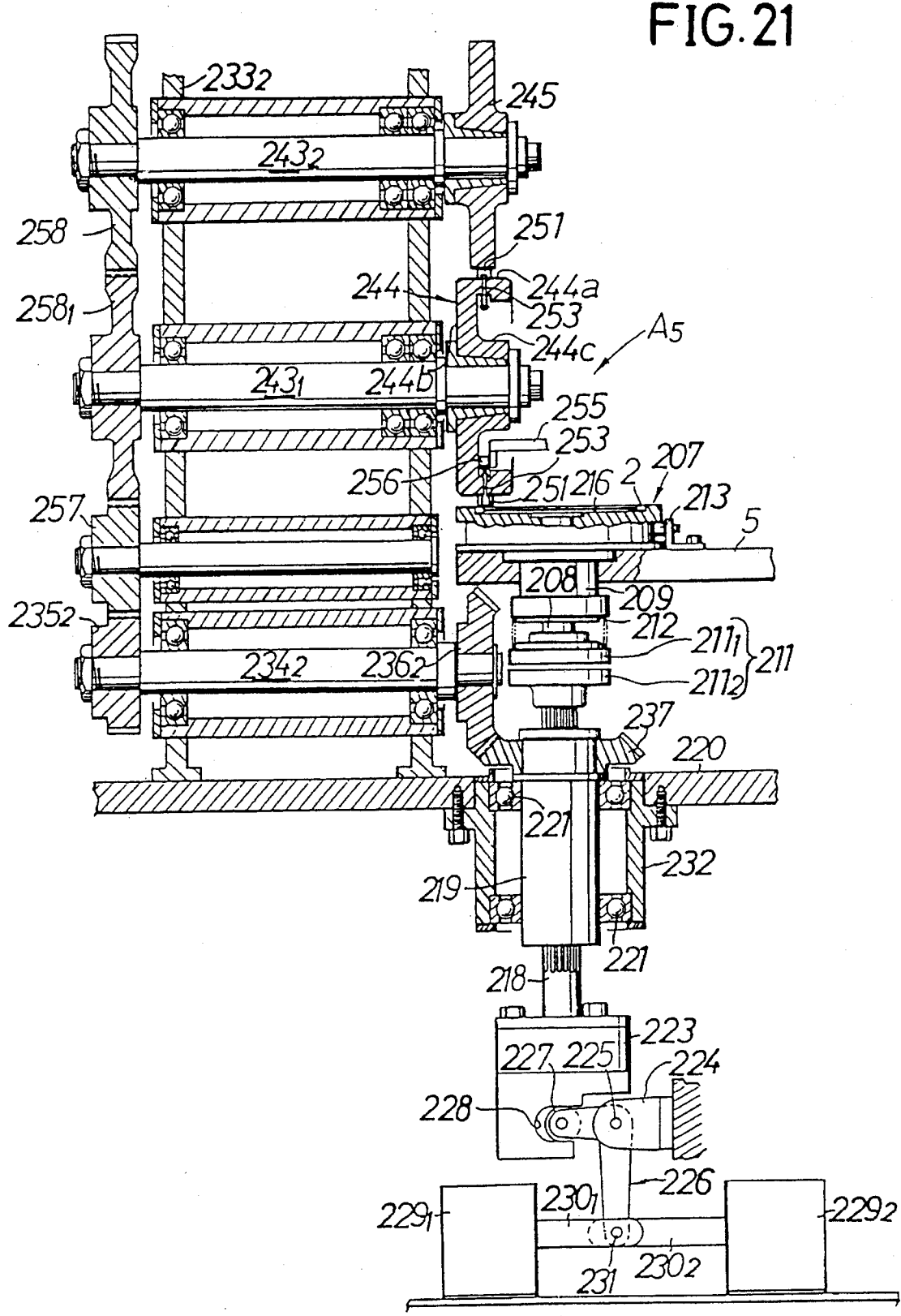

The turn table 5 is turned for 45° to transfer the core 2 to the position for the first adhering mechanism $A_5$. At this position, the support 207 is lifted and rotated as in the adhesive applying operation, and the friction material segments 3 which has been cut out from the friction material tape 24 and retained and transferred by the cutting roller are sequentially pressed against and adhered one by one to the bonding surface $2a$ of the core 2, as shown in FIG. 20, thus completing the adhering operation for the large number of friction material segments 3 to the bonding surface $2a$. The details of this friction material segment 3 adhering operation will be described below.

The turn table 5 is turned for 45° to transfer the core 2 to the position for the reversing mechanism R, where the core 2 is reversed, thereby turning the other bonding surface $2b$ up.

The turn table 5 is turned for every 45° to sequentially transfer the core 2 to the positions of the second adhesive applying mechanism $C_4$ and the second adhering mechanism $A_6$, where the application of the adhesive to the bonding surface $2b$ of the core 2 and the bonding of the friction material segments 3 to the bonding surface $2b$ are conducted in the same manner as describer above, thereby providing a friction plate 1.

The turn table 5 is turned for 45° to transfer the friction plate 1 to the position for the pressing mechanism P, where a pressing force is applied commonly to all the friction material segments 3 to bond the same onto the core 2 reliably.

The turn table 5 is turned for 45° to transfer the friction plate 1 to the position for the inspecting mechanism $I_2$. At this position, the support 207 is lifted and rotated as in the adhesive applying operation, and it is inspected whether or not a predetermined number of friction material segments 3 are bonded to the core 2.

The turn table 5 is turned for last 45° to transfer the friction plate 1 to the position for the loading/unloading mechanism L. Until the first friction plate 1, which is made from a core firstly supplied on the support 207, reaches the inspecting mechanism $I_2$, the loading/unloading mechanism L repeats, 7 times, the core supplying operation similar to that described above upon every rotation of the turn table 5 for 45°. In this case, in order to supply the cores 2 one by one, a push-up mechanism is incorporated at the terminating end of the conveyor $6_1$ for retaining the upper most core 2 at the same level.

When the friction plate 1 has been transferred to the position of the loading/unloading mechanism L in the above-described manner, for example, the first rotatable arm $21_1$ is located above the support 207. In the loading/unloading mechanism L, the rotatable arms $21_1$, $21_2$ and $21_3$ are lowered. The first rotatable arm $21_1$ grasps the friction plate 1 on the turn table 5 horizontally by the collet chuck 2, while the second rotatable arm $21_2$ grasps the core 2 on the first conveyor $6_1$ horizontally by the collet chuck 22. Then, the rotatable arms $21_1$, $21_2$ and $21_3$ are lifted and rotated for 120°. When the rotatable arms $21_1$, $21_2$ and $21_3$ are lowered again, the first rotatable arm $21_1$, releases the friction plate 1 from the collet chuck 22, and the core is released from the collet chuck 22 of the second rotatable arm $21_2$. Then, the rotatable arms $21_1$, $21_2$ and $21_3$ are lifted again. Such motions are conducted sequentially, thereby placing the friction plate 1 onto the starting end of the second conveyor $6_2$, while placing the core 2 into the recess 216 of the support 207, thus positioning it. The friction plate 1 transported by the second conveyor $6_2$ is subjected to a drying process for drying the adhesive.

In this manner, the manufacture of the friction plate 1 is continuously carried out automatically.

The first and second adhering mechanisms $A_5$ and $A_6$ will be described below. The mechanisms $A_5$ and $A_6$ have the same construction, as described above, and hence, only the first adhering mechanism $A_5$ will be described.

A support frame $233_2$ stands on the upper surface of the support plate 220 in the vicinity of the outer periphery f the turn table 5. A first rotary shaft $243_1$ is rotatably supported on the support frame $233_2$ at an intermediate portion thereof above the support 207. The shaft $243_1$ has the axis perpendicular to the rotational axis of the support 207. A cutting roller 244 is secured to one end of the first rotary shaft $243_1$ above the turn table 5 in a manner that a portion of an outer peripheral surface thereof is opposed to the bonding surface 2a of the core 2. Immediately above the first rotary shaft $243_1$, a second rotary shaft $243_2$ is rotatably supported on the support frame $233_2$ in parallel to the first rotary shaft $243_1$. A receiving roller 245 is secured to one end of the second rotary shaft $243_2$ above the turn table 5. The cutting roller 244 and the receiving roller 245 are in rolling contact with each other and rotated in opposite directions.

The friction material tape 24 is obtained by subjecting a friction material sheet to a slitting process. As shown in FIG. 18, a reel 26 is disposed in the vicinity of the turn table 5 with the friction material tape 24 wound therearound. A guide member 248 is disposed to locate its tip end near the contact portion of the cutting roller 244 and the receiving roller 245. The guide member 248 is provided with a through hole 247 through which the friction material tape 24 is inserted. A feed roller pair 249 as a feeding member is disposed at the upstream of the guide member 248 in the supplying direction of the material tape 24. Accordingly the friction material tape 24 is unwound from the reel 26 by the aid of the feed roller 249, through the through hole 247 in the guide member 248, and fed into between the cutting roller 244 and the receiving roller 245. In FIG. 18, reference numeral 37 designates a tensioning roller for providing a given tension to the friction material tape 24.

The cutting roller 244 comprises a short cylinder 244a, an annular end wall 244b connected to the short cylinder 244a at its end adjacent the support frame $233_2$, and a boss 244c projecting from the center of the annular end wall 244b into the short cylinder 244a.

Figure 23:
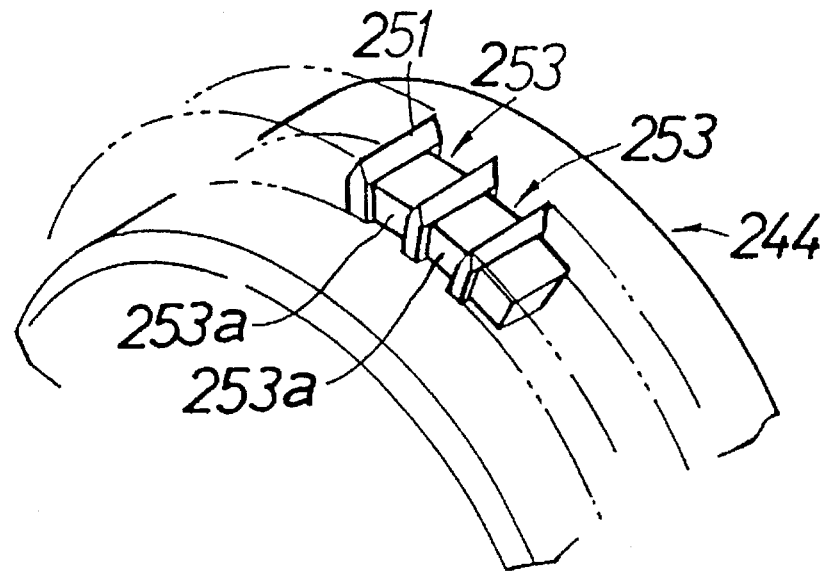
Figure 24:
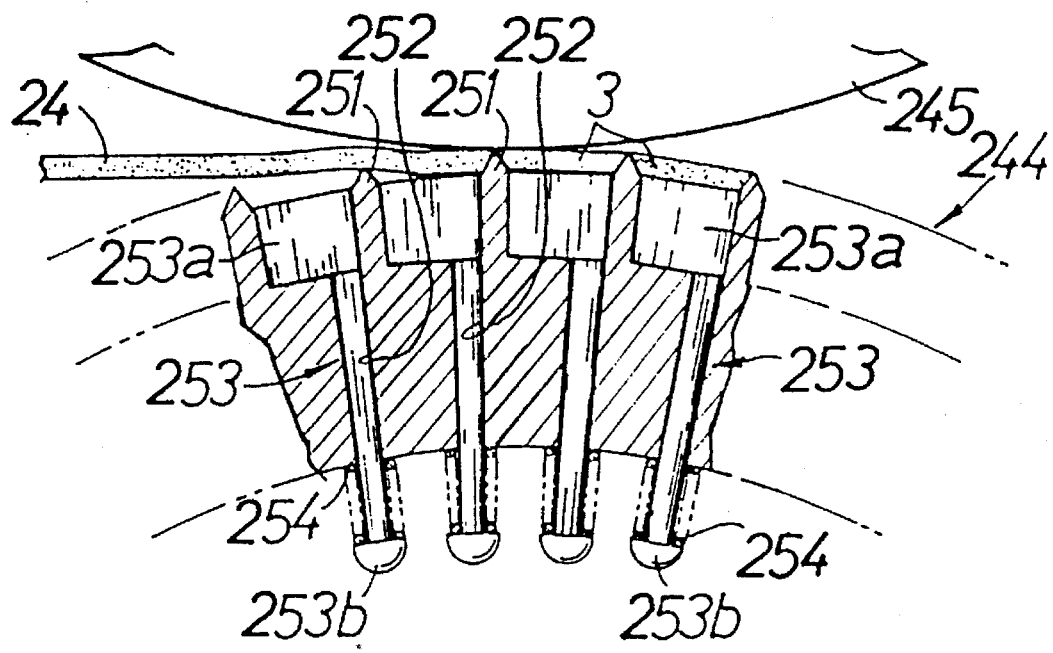

Referring also to FIGS. 23 and 24, the short cylinder 244a includes a large number of cutting blades 251 which are disposed radially on an outer peripheral surface thereof at equal distances. The cutting blades 251 can be in contact with the receiving roller 245. A cutting edge of each of the cutting blades 251 are oriented in a generating line of the outer peripheral surface of the short cylinder 244a. The spacing between two adjacent cutting blades 251 is equal to the width of the friction material segment in circumferential direction of the core 2.

A through hole 252 is formed in the short cylinder 244a between every two adjacent cutting blades 251. A pressing pin 253 as a pressing member is slidably received in each of the through holes 252. The pressing pin 253 includes a pressing portion 253a and a hemispherical engage portion 253b on opposite ends thereof. The pressing portion 253a is disposed between the opposed surfaces of the cutting blades 251. The hemispherical engage portion 253b is located within the short cylinder 244a. A spring 254 is compressed between an inner peripheral surface of the short cylinder 244a and the engage portion 253b.

Figure 25:
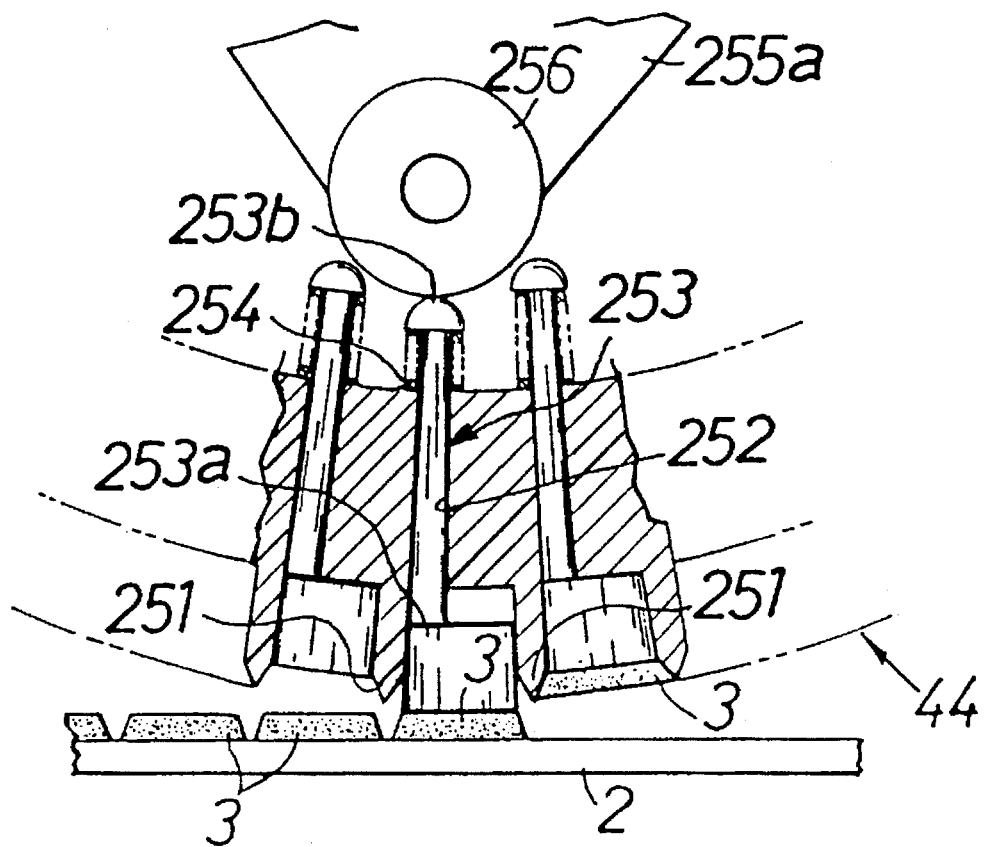

As shown in FIG. 25, in a retreated position of the pressing pin 253 in which the pressing pin 253 slides inwardly radially of the short cylinder 244a by a resilient force of the spring 254, each of the points of the opposed blades 251 projects from an end face of the pressing portion 253a by a distance equal to the thickness of the friction material segment. On the other hand, in an advanced position of the pressing pin 253 in which the pressing pin 253 slides outwardly radially of the short cylinder 244a against the resilient force of the spring 254, the end face of the pressing portion 253a projects from the level of the points of the opposed cutting blades 251.

A roller supporting portion 255a of a stationary bracket 255 protrudes into the short cylinder 244a between the rotational axis of the cutting roller 244 and the core 2. A push-out roller 256 supported by a pin on the roller supporting portion 255a with its rotational axis parallel to that of the cutting roller 244. The roller 256 is adapted to come into sliding contact with the engage portion 253b of one of the pressing pins 253 as a result of rotation of the cutting roller 244, thereby causing such pressing pin 253 as a result of rotation of the cutting roller 244, thereby causing such pressing pin 253 to slide from the retreated position to the advanced position against the resilient force of the spring 254. This allows the friction material segment 3 retained by the opposed cutting blades 251 to be pushed out by the pressing pin 253 and pressed against and adhered to the bonding surface 2a of the core 2.

As described above, the lifting/rotating mechanism for the support 207 is provided below the turn table 5 at the position for the first adhering mechanism $A_5$. A first gear $258_1$ secured to the first rotary shaft $243_1$ is meshed, through a transmitting gear 257, with a driving gear $235_2$ of a driving shaft $234_2$ which is a component of such lifting/rotating mechanism. And a second gear $258_1$ secured to the second rotary shaft $243_2$ is meshed with the first gear $258_1$.

The number of teeth of each of the gears $235_2$, $236_2$, $237_2$, 257, $258_1$ and $258_2$ is set such that the support 207 and the cutting roller 244 rotate synchronously.

The operation of the first adhering mechanism $A_5$ will be described below in connection with FIGS. 22, 24 and 25.

Figure 22:
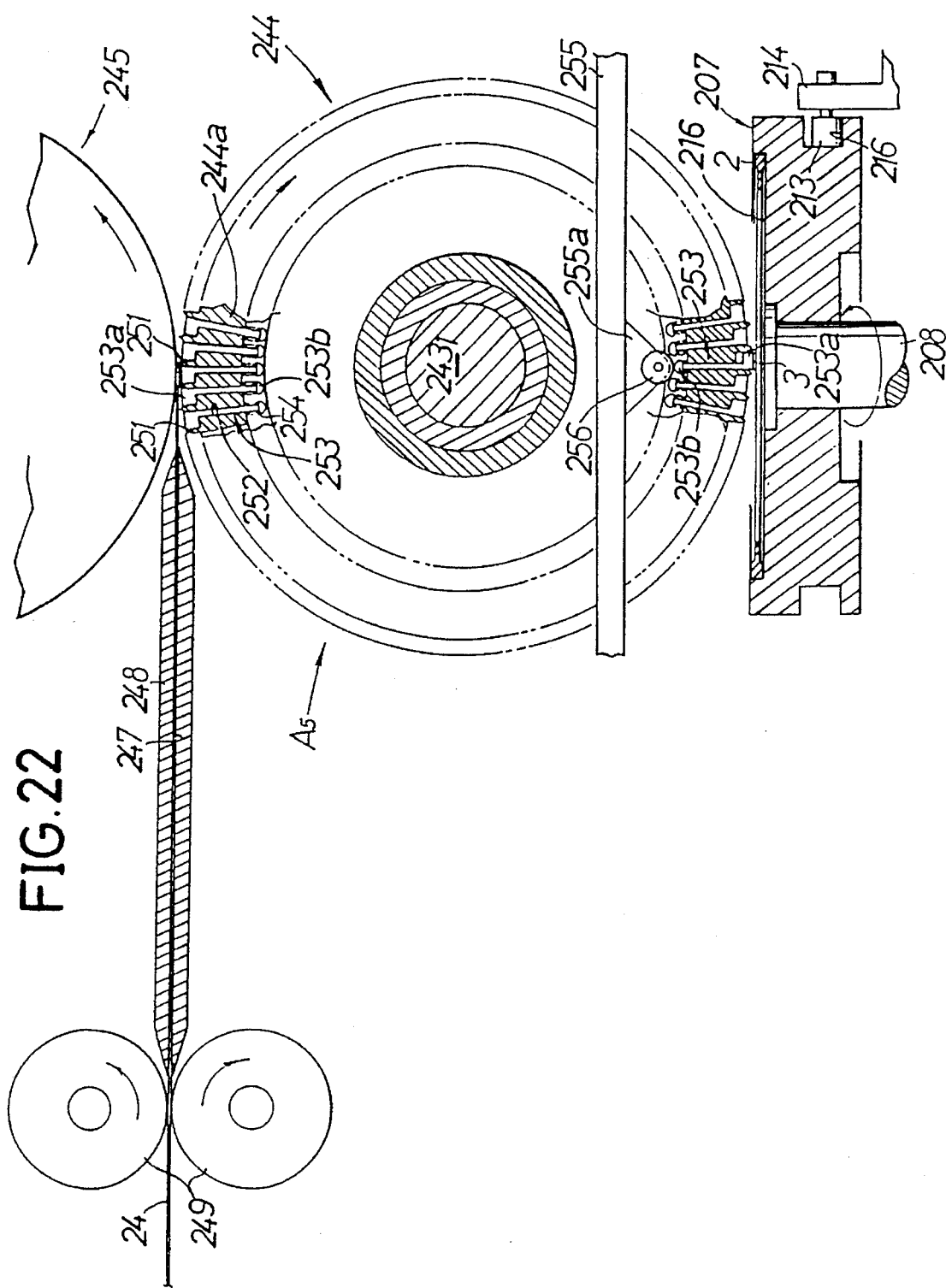

The support 207 with the core 2 with the adhesive on the bonding surface 2a is in its lifted position and rotated in a counter clockwise direction as viewed in FIG. 22 by the driving gear $235_2$. The cutting roller 244 is in a clockwise direction as viewed in FIG. 22 and the receiving roller 245 is rotated in the counter clockwise direction, both synchronously with the support 207. The tip end of the friction material tape 24 has been pulled out from between the cutting roller 244 and the receiving roller 245 prior to the operation.

When the friction material tape 24 has been fed into between the cutting roller 244 and the receiving roller 245 by the feed roller pair 249, a piece of friction material segment 3 is cut out by cooperation of the two cutting rollers 251: one located forwardly in the rotational direction and the other located rearwardly in the rotational direction adjacent the one cutting roller 251, and the receiving roller 245, as shown in FIG. 24. Such friction material segment 3 is retained between the opposed cutting blades 251 which have contributed to the cutting. In this case, the pressing pine 253 between these two cutting blades 251 is in the retreated position, and a feeding force is applied to the friction material tape 24. Therefore, the friction material segment 3 is deformed so as to describe a convex arc toward the end face of the pressing portion 253a of the pressing pin 253. This ensures that the friction material segment 3 is reliably retained between the two cutting blades 251.

The cutting and retaining of the friction material segment 3 is conducted sequentially by cooperation of the two adjacent cutting blades 251 and the receiving roller 245.

When a piece of friction material segment 3 is transferred to just above the bonding surface 2a of the core 2 as a result of rotation of the cutting roller 244, as shown in FIG. 25, the engage portion 253b of the pressing pin 253 located between the two cutting blades 251 for retaining such friction material segment 3 is brought into rolling contact with the push-out roller 256. As a result, the pressing pin 253 slides to the advanced position, so that the friction material segment 3 is pushed out from between the two cutting blades 251 and pressed against and adhered to the bonding surface 2a of the core 2 by the pressing portion 253a.

The pressing and adhering of the friction material segment 3 are applied sequentially to the bonding surface 2a of the core 2. When the pressing pin 253 departs from the push-out roller 256, it returns to the retreated position by the resilient force of the spring 254.

It should be noted that in order to manufacture the friction plate 1 efficiently in a short time, the number of cutting/ adhering components such as the cutting rollers 244 and the receiving rollers 245 in each of the adhering mechanisms $A_5$ and $A_6$, i.e., the number of friction material tapes 24 supplied may be varied properly depending upon the magnitude of the diameter of the core 2.

An apparatus for automatically manufacturing friction plate according to a fourth embodiment of the present invention will now be described in connection with FIGS. 26 to 29, wherein parts or components corresponding to those in the above-described embodiments are designated by like reference characters.

Figure 26:
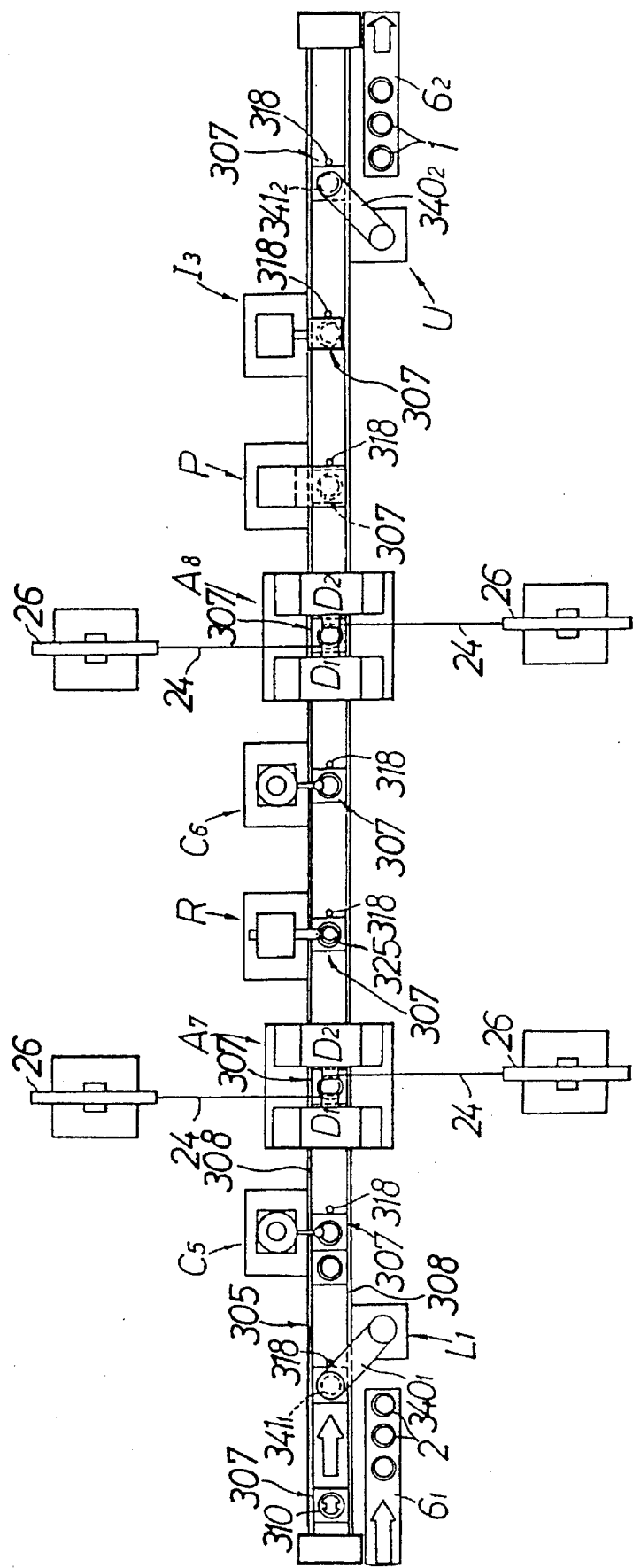

FIG. 26 illustrates an apparatus for automatically manufacturing a friction plate 1 of the type firstly described above. The apparatus comprises a chain type main conveyor 305 which conveys an object from a left end toward a right end. The apparatus further comprises a loading mechanism $L_1$ for supplying a core, a first adhesive applying mechanism $C_5$, a first adhering mechanism $A_7$, a reversing mechanism R, a second adhesive applying mechanism $C_6$, a second adhering mechanism $A_5$, a pressing mechanism P, an inspecting mechanism I, and an unloading mechanism U for removing a friction plate. These mechanisms are disposed sequentially at predetermined distances from the left end toward the right end in the vicinity of and along the main conveyor 305.

A first conveyor 61 is disposed in parallel at the left end of the main conveyor 305 for transporting a core 2 to the position for the loading mechanism $L_1$. A second conveyor $6_2$ is disposed in parallel at the right end of the main conveyor 305 for transporting the friction plate 1 removed by the unloading mechanism U.

During operation of manufacturing the friction plate 1, the main conveyor 305 is always adapted to convey an object from the left end to the right end as viewed in FIG. 26. A plurality of carrying rests 307 are placed on the main conveyor 305 for carrying a core 2 (or a Friction plate 1).

Figure 27:
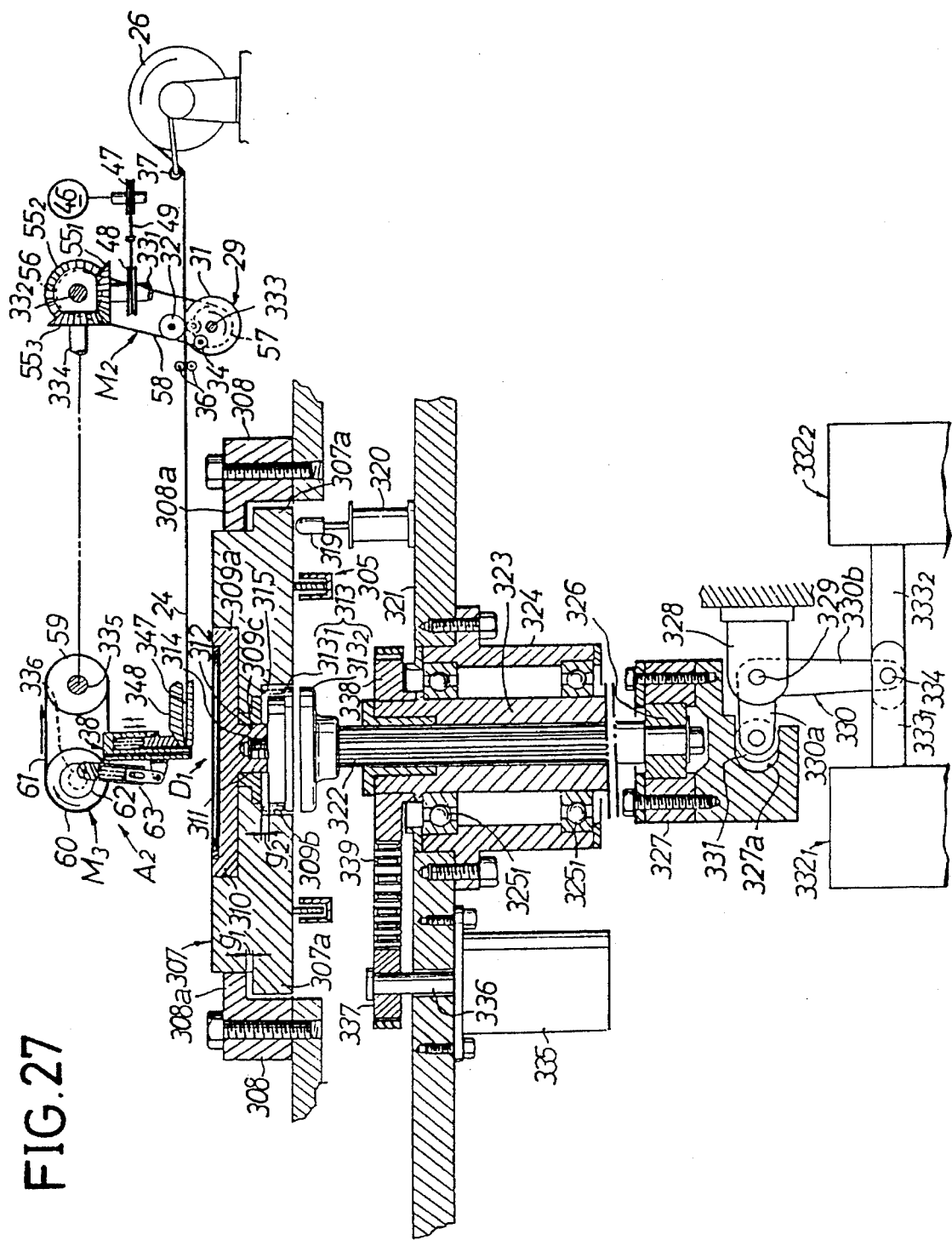

Referring also to FIG. 27, each of the carrying rests 307 is substantially a rectangular shape in plane, and the transportation thereof is guided by a pair of guide members 308 located on opposite sides of the main conveyor 305 in a direction of movement of the main conveyor 305. Each of the guide members 308 includes projecting edges 308a projecting inwardly. The carrying rest 307 includes projecting edges 307a at opposite sides located below the projecting edges 308a. A predetermined gap $g_1$ is formed between the projecting edges 307a and 308a so that the transportation of the carrying rest cannot be obstructed.

The carrying rests 307 have the same construction and each comprises a large diameter circular recess 309a opened upwardly a mean diameter circular recess 309b opened downwardly, and a small diameter bore 309c communicating the large and small recesses 309a and 309c with each other. A disk-like core support 310 is rotatably received in the large diameter recess 309a, and a projecting shank 311 on a lower surface of the support 310 is likewise rotatably received in a bearing member 312 which defines the small diameter bore 309c. A half $313_1$ constituting a friction clutch 313 together with a half $313_2$ is accommodated in the mean diameter recess 309b and has a threaded shaft 314 which is projectingly provided on an upper surface thereof and screwed in the projecting shank 311. A spring 315 is compressed between the half 313, and a ceiling surface of the mean diameter recess 309b. The half $313_1$ is biased downwardly by a resilient force of the spring 315 to form a gap $g_2$ between the ceiling surface and an upper surface of the half $313_1$.

Figure 28:
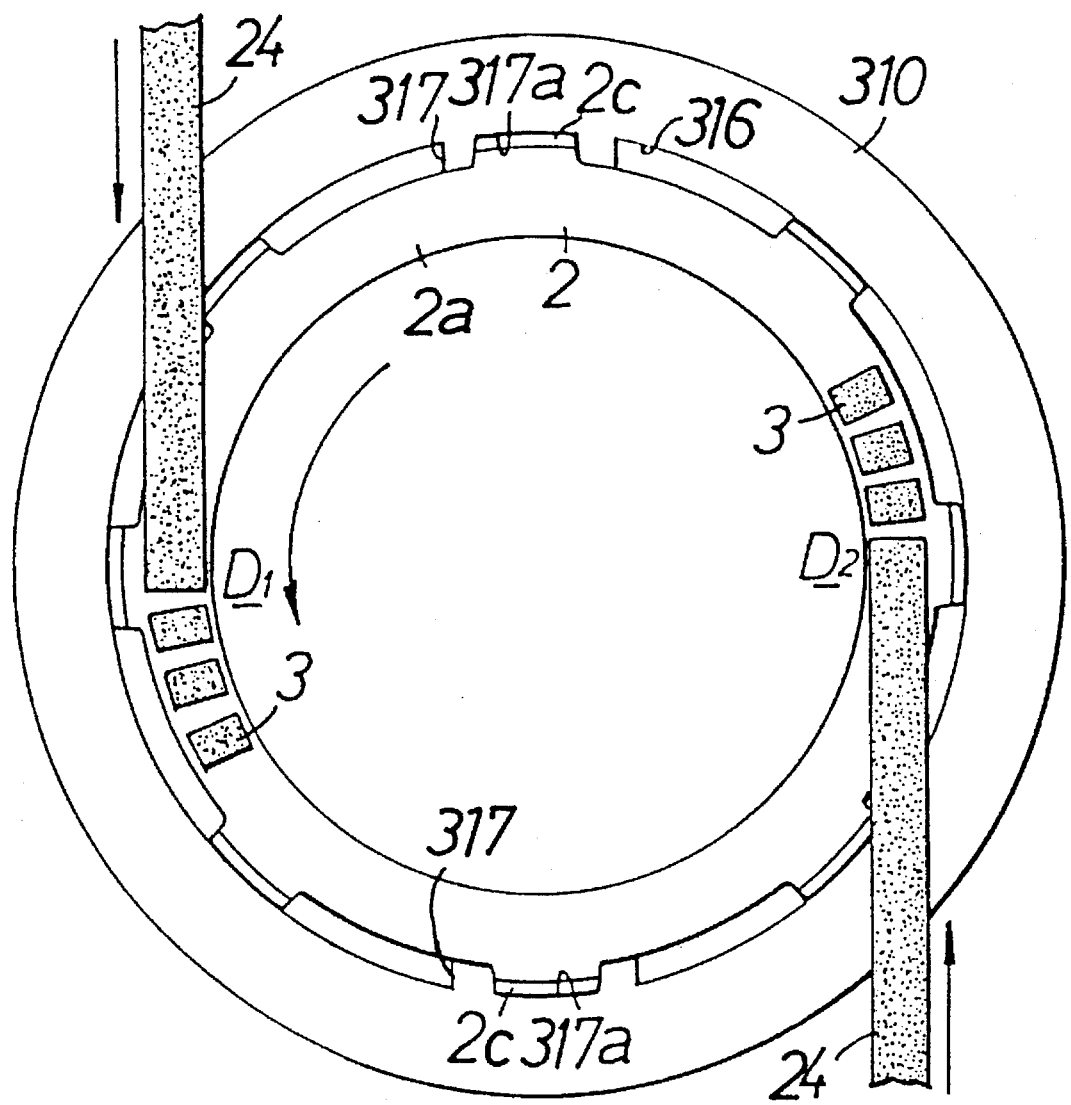

As shown in FIG. 28, the support 310 includes a recess 316 opened upwardly for receiving a core 2. Two projections 317 are formed at opposed locations on an inner peripheral surface of the recess 316 to form engage recesses 317, respectively. The recess 317 are adapted to be fitted by two of a plurality of engage projections 2c located in an outer peripheral surface of the core 2. The positioning of the core 2 relative to the support 310 is achieved by the engagement of the recesses 317 with the projections 2c.

A mechanism for fixing the carrying rest 307 and a mechanism for lifting and rotating the support 310 are provided below the main conveyor 305 at each of the positions for the first and second adhesive applying mechanisms $C_5$ and $C_6$, the first and second adhering mechanisms $A_7$ and $A_8$ and are used for applying and adhering operations of these mechanisms.

The fixing mechanism includes a stop pin 318 (FIG. 26) and an operating cylinder 320. The stop pin 318 is adapted to project into a path for the carrying rest 307 to stop the carrying rest 307, when the carrying rest 307 is transferred to each of corresponding positions. The operating cylinder 320 is adapted to lift the carrying rest 307 above the main conveyor 305 to cause both projecting edges 307a to mate with the projecting edges 308a of the guide members 308 respectively by expanding a piston rod 319, when the carrying rest 307 has been stopped. The operating cylinder 320 is disposed on the upper surface of the support plate 321 below four corners of the carrying rest 307.

The lifting/rotating mechanism is constructed in the following manner:

A splined shaft 322 having the half $313_2$ constituting the friction clutch 313 at its upper end is disposed so that the half $313_2$ can be opposed to the half $313_1$ of the carrying rest 307. A splined cylinder 323 meshed with the splined shaft 322 is supported in a support cylinder 324 fixed to the support plate 321. Bearings 325 are interposed between the cylinders 323 and 324. A roller 326 is secured to the splined shaft 322 at lower end projecting downwardly from the splined cylinder 323. A transmitting member 327 is mounted to the roller 326 in such a manner to permit the rotation of the roller 326. A bell-crank 330 is swingably supported on a stationary bracket 328 through a support shaft 329 in the vicinity of the transmitting member 327. A roller 331 is mounted at a tip end of a horizontal arm 330a of the bell-crank 330 to engage a notch-like engage groove 327a opened sideways in the transmitting member 327. The bell-crank 226 has a vertical arm 330b which is connected at its lower end to tip ends of opposed operating elements $333_1$ and $333_2$ of a solenoid $332_1$ for lifting and a solenoid $332_2$ for lowering through a common pin 334.

Thus, when the solenoid $332_1$ for lifting is activated to withdraw the operating element $333_1$ the bell-crank 330 is swung in a clockwise direction as viewed in FIG. 27 about the support shaft 334 to lift the splined shaft 322, bringing the halves $313_1$ and $313_2$ into frictional contact with each other. The support 310 is lifted up on an amount corresponding to the gap $g_2$ against the resilient force of the spring 315, thereby retaining the core 2 at a predetermined level relative to the adhesive applying mechanisms $C_5$ and $C_6$ and the adhering mechanisms $A_7$ and $A_8$. The swinging movement of the bell-crank 330 is accepted by plays of the operating elements $333_1$ and $333_2$ relative to bodies of the solenoids.

An electric motor 335 is mounted to the lower surface of the support plate 321 in the vicinity of the support cylinder 324. A driving gear 337 is secured to an upper end of a driving shaft 336 extending through the support plate 321. A toothed timing belt 339 is mounted between the driving gear 337 and a follower gear 338 secured to an outer peripheral surface of the splined cylinder 323 at its upper end.

This ensures that when the electric motor 335 is operated with the halves $313_1$ and $313_2$ in frictional contact warn earn other to provide the engagement of the friction clutch 313, the splined shaft 322 and thus the support 310 and the core 2 are rotated through the driving gear 337, the timing belt 339, the follower gear 338 and the splined cylinder 323.

The electric motor 335 located at the positions for the adhesive applying mechanisms $C_5$ and $C_6$ is continuously rotated, and the core 2 is rotated in one rotation. The electric motor 335 located at the positions of the adhering mechanisms $A_7$ and $A_8$ is intermittently rotated during every adhesion of the friction material segment.

The above-described fixing mechanism and a lifting mechanism, excluding a rotatable member such as the electric motor 335, are disposed at each of positions for the loading mechanism $L_1$, the reversing mechanism R, the pressing mechanism P, the inspecting mechanism I and the unloading mechanism U.

The loading mechanism $L_1$ comprises a liftable and swingable arm $340_1$ adapted to reciprocally swing between the main conveyor 305 and the first conveyor $6_1$. A collar chuck $341_1$ is mounted at a tip end of the swingable arm $340_1$ and engageable with and disengageable from the inner peripheral surface of the core 2. The unloading mechanism U is constructed in the same manner as the loading mechanism $L_1$, and hence, comprises a swingable arm $340_2$ and a collet chuck $341_2$.

Figure 29:
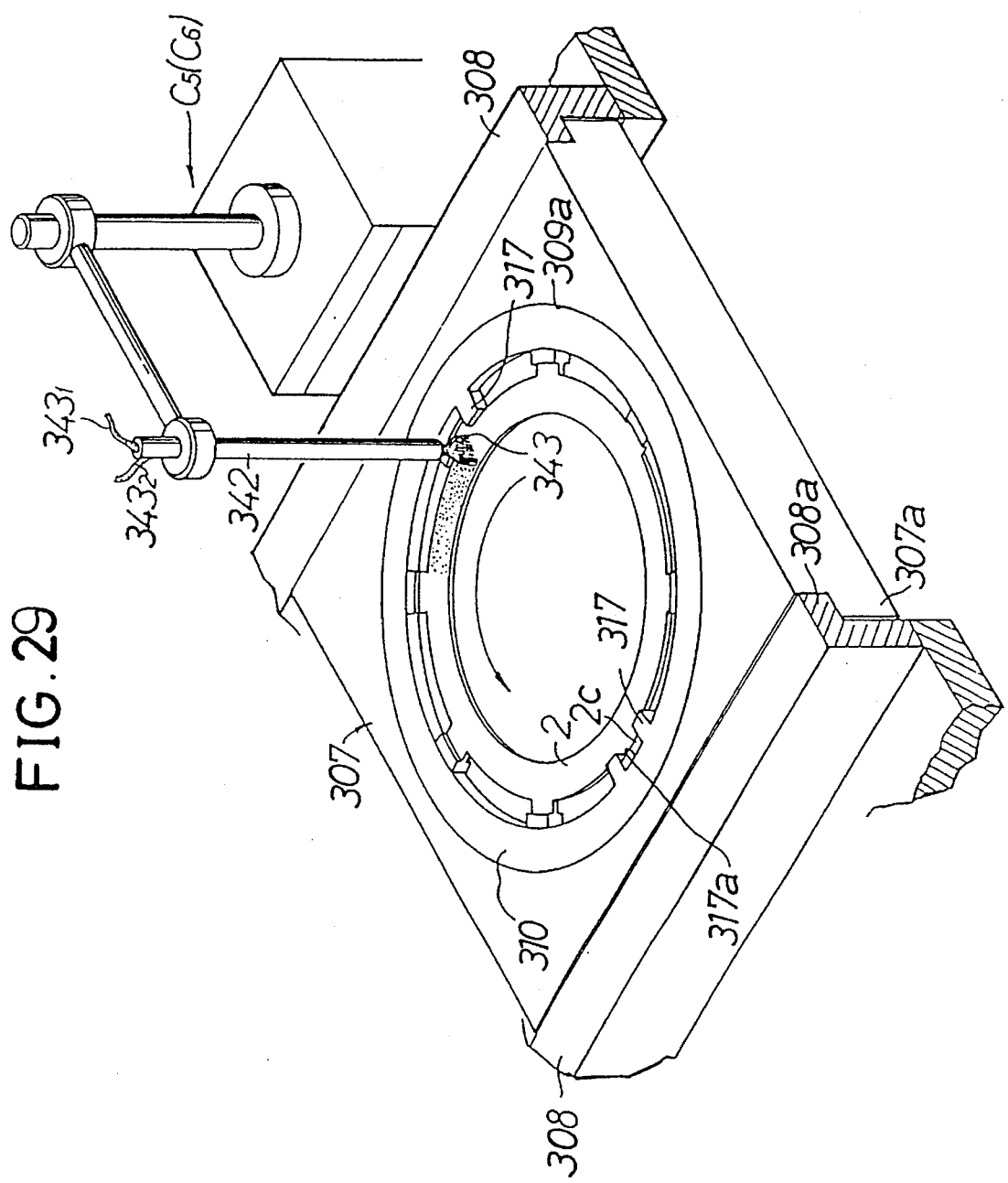

The first and second adhesive applying mechanisms $C_5$ and $C_6$ have the same construction and each comprises a stationary brush 343 mounted at a lower end of a hollow shaft 342, as shown in FIG. 29, and an adhesive is supplied through a first feed pipe $343_1$ to the hollow shaft 342 and pressurized air for feeding the adhesive is supplied through a second feed pipe $343_2$ to the hollow shaft 342.

The first and second adhering mechanisms $A_7$ and $A_8$ have the same construction. Two friction material tapes 24 are unwound in an amount corresponding to a piece of friction material segment 3 at a plurality of unwind positions arranged at equal distances in a circumferential direction of the core 2, e.g.., two unwind positions $D_1$ and $D_2$, and friction material segments 3 are cut out one by one from each of the friction material tapes 24 and subsequently pressed against and adhered to the bonding surfaces 2a and 2b of the core 2. The details of the mechanisms $A_7$ and $A_8$ will be described hereinafter.

The reversing mechanism R comprises a pair of liftable and rotatable hands 25. The reversing mechanism R functions, after completion of the bonding of the friction material segments 3 to one of the bonding surfaces 2a, to lift and reverse the core 2 by bringing the hands 25 into engagement with the outer peripheral surface of the core 2, thereby turning the other bonding surface 2b up.

The pressing mechanism P is intended to apply a pressing force commonly to all the friction material segments 3 adhered to the opposite bonding surfaces 2a and 2b of the core 2 to insure the reliable adhesion of the friction material segments 3 to the opposite bonding surfaces 2a and 2b of the core 2.

The inspecting mechanism I is adapted to photo-electrically detect whether or not a predetermined number of friction material segments 3 re adhered to the opposite bonding surfaces 2a and 2b of the core 2.

A procedure of manufacturing a friction plate 1 by the above-described apparatus will be described below.

Before the start of the manufacturing operation, the cores 2 with the one bonding surface 2a facing upwards are piled one on another on the first conveyor $6_1$ and transported to the terminating end of the vicinity of the loading mechanism $L_1$.

The main conveyor 305 is operated, and the carrying rest 307 is placed onto the main conveyor 305 at the left end thereof. When the carrying rest 307 has reached the position for the loading mechanism $L_1$, it is stopped by projection of the stop pin 318. Then, the piston rod 319 of the operating cylinder 320 is expanded to lift the carrying rest 308 to a position above the main conveyor 305 and fix it.

Thereafter, the solenoid $332_1$ for lifting is activated to lift the carrying rest 310 through the splined shaft 322 and the like.

The swingable arm $340_1$ is lowered to the first conveyor $6_1$ by the operation of the loading mechanism $L_1$ to grasp one core 2 on the first conveyor $6_1$. Then, the swingable arm $340_1$ is lifted and thereafter, is swung to above the main conveyor 305, and lowered again to release the core 2. This causes the core 2 to be fitted into and positioned in the recess 316 in the support 310 with the one bonding surface 2a facing upwards.

The solenoid $332_1$ for lowering is activated, thereby lowering the splined shaft 322 and permitting the support 310 to be lowered by the resilient force of the spring 315. Then, the piston rod 319 of the operating cylinder 320 is constructed, and the stop pin 318 is lowered, permitting the carrying rest 307 to be placed again onto the main conveyor 305 and transported.

When the carrying rest 307 has reached the position for the first adhesive applying mechanism $C_5$, the lifting and fixing of the carrying rest 307 and the subsequent lifting of the support 310 are conducted in the same manner as described above, thereby bringing the bonding surface 2a of the core 2 into sliding contact with the brush 343.

The electric motor 335 is operated for continuous rotation, thereby rotating the support 310, and the adhesive is applied to the bonding surface 2a of the core 2.

The carrying rest 307 is placed again onto the main conveyor 305 and transported in the same manner as described above.

When the carrying rest 307 has reached the position for the first adhering mechanism $A_7$, the lifting and fixing of the carrying rest 307 and the subsequent lifting of the support 310 are conducted in the same manner as described above.

Each of the friction material tapes 24 is unwound to each of the unwound positions $D_1$ and $D_2$ above the core 2 in an amount corresponding to a piece of friction material segment 3. Thereafter, each of the friction material tapes 24 is subjected to a cutting process to provide a friction material segment 3 which is then pressed against and adhered to the bonding surface 2a of the core 2.

Thereafter, each of the friction material tapes 24 is unwound in an amount corresponding to the next friction material segment, and the electric motor 335 is operated for intermittent rotation to rotate the core 2 along with the support 310 for the adhering such friction material segment.

The above-described unwinding, cutting, pressing/adhering and intermittently rotating operations are repeated sequentially, thereby adhering a large number of friction material segments 3 one by one to the one bonding surface 2a, as shown in FIG. 28. The detail of the operation of adhering the friction material segments 3 will be described below.

The carrying rest 307 is placed again onto the main conveyor 305 and transported in the same manner as described above.

When the carrying rest 307 has reached the position for the reversing mechanism R, the lifting and fixing of the carrying rest 307 and the subsequent lifting of the support 310 are conducted in the same manner as described above. The core 2 is reversed by the reversing mechanism R to turn the other bonding surface 2b up.

Then, the application of the adhesive by the second adhesive applying mechanism $C_6$ and the adhering of a large number of friction material segments 3 by the second adhering mechanism $A_8$ are conducted in the same manner to provide a friction plate.

Thereafter, the carrying rest 307 is transported to the position for the pressing mechanism P, where a pressing force is applied commonly to all the friction material segments 3 to insure the reliable bonding of these segments 3, and then, the carrying rest 307 is transported to the position for the inspecting mechanism I. In this position, the inspecting mechanism I inspects whether or not a predetermined number of friction material segments are adhered to the core 2. Even in the positions for the pressing mechanism P and the inspecting mechanism I, the lifting and fixing of the carrying rest 307 and the subsequent lifting of the support 310 are conducted.

When the lifting and fixing of the carrying rest 307 and the subsequent lifting of the support 310 have been conducted in the position for the unloading mechanism U, the swingable arm $340_2$ is lowered to the main conveyor 305 by the operation of the mechanism U to grasp the friction plate 1 on the support 310. Then, the swingable arm $340_2$ is lifted and then, is lowered again to release the friction plate 1. This causes the friction plate 1 to be placed onto the starting end of the second conveyor $6_2$. The friction plate 1 transported by the second conveyor $6_2$ is subjected to a drying process for drying the adhesive.

The manufacture of the friction plate 1 is continuously carried out automatically in this manner.

The first and second adhering mechanisms $A_7$ and $A_8$ will now be described. The mechanisms $A_7$ and $A_8$ have the same construction, as described above and hence, only the first adhering mechanism $A_7$ will be described.

The friction material tape 24 is obtained by subjecting friction material sheet to a slitting process. As shown in FIG. 26, a pair of reels are disposed on opposite sides of the main conveyor 305 with the friction material tape 24 wound therearound, respectively. A guide cylinder 348 (FIG. 27), having a through hole 347 through which each of the friction material tapes 24 is inserted, is disposed above the main conveyor 305, so that the tip end of the friction material tapes 24 can be guided to each of the unwind positions $D_1$ and $D_2$.

An unwinding mechanism 29 is disposed between each of the reels 26 and the corresponding guide cylinder 348 for intermittently unwinding the friction material tape 24 in an amount corresponding to a piece of friction material segment 3 to each of the unwind positions $D_1$ and $D_2$. The unwinding mechanism 29 has the same construction s that in the previously described first embodiment.

A liftable pressing mechanism 38 is disposed in the vicinity of each of the guide cylinder 348 for cutting out the friction material segment 3 from the friction material tape 24 and subsequently pressing and adhering it to the core 2. The pressing mechanism 38 has the same construction as that in the previous first embodiment.

In this embodiment, a mechanism $M_2$ for operating the unwinding mechanism 29 and a mechanism $M_3$ for lifting the pressing mechanism 38 are similar to those in the first embodiment, and the operation of the first adhering mechanism $A_7$ is also similar to that in the first embodiment.

What is claimed is:

1. An apparatus for manufacturing a friction plate for a clutch, the friction plate being comprised of a large number of friction material segments adhesively bonded to each of opposite bonding surfaces of an annular core in a circumferential direction of the core with oil grooves provided between adjacent segments, said apparatus comprising:

a support for positioning said core thereon with either of said opposite bonding surfaces having an adhesive applied thereto being turned upwards, said support being intermittently rotated for adhesive-bonding of every one of the friction material segments;

an unwinding mechanism for intermittently unwinding a friction material tape to a position above said support in an amount corresponding to each of the friction material segments;

a liftable pressing mechanism for subjecting said friction material tape to a cutting, and pressing and adhesively bonding the resulting cut friction material segment to said core;

means for reversing the annular core to direct its other bonding surface upwards upon completion of adhering of the friction material segments to one bonding surface; and means for pressing the annular core with the friction material segments adhered to both of its opposite bonding surfaces, in order to form the friction plate.

2. An apparatus for manufacturing a friction plate for a clutch, the friction plate being comprised of a large number of friction material segments adhesively bonded to each of bonding surfaces of an annular core in a circumferential direction of the core with oil grooves provided between adjacent segments, said apparatus comprising:

a support for positioning said core thereon with either of the opposite bonding surfaces having an adhesive applied thereto being turned upwards, said support being intermittently rotated for adhesive-bonding of every friction material segment;

an unwinding mechanism for unwinding a friction material tape to a position above said core, said tape having a width corresponding to that of the friction material segments which are to be located on areas of said core which are equally divided circumferentially; and a liftable pressing mechanism for subjecting said friction material tape to a multiple punching to provide a plurality of the friction material segments, and pressing and adhesively bonding the resulting friction material segments to said core;

means for reversing the annular core to direct its other bonding surface upwards upon completion of adhering of the friction material segments to one bonding surface; and means for pressing the annular core with the friction material segments adhered to both of its opposite bonding surfaces, in order to form the friction plate.

3. An apparatus for manufacturing a friction plate for a clutch, the friction plate being comprised of a large number of friction material segments adhesively bonded to each of opposite bonding surfaces of an annular core in a circumferential direction of the core with oil grooves provided between adjacent segments, said apparatus comprising:

a feed mechanism for feeding a friction material tape to a position between a cutting roller and a receiving roller which are rotated with their outer peripheral surfaces opposed to each other, a support disposed around said cutting roller to rotate synchronously with the cutting roller, for supporting said core with either of the opposite bonding surfaces opposed to the outer peripheral surface of said cutting roller, said cutting roller including a large number of cutting blades disposed radially at equal distances on the outer peripheral surface thereof, two adjacent cutting blades of the cutting blades being capable of cutting off the friction material segment from the friction material tape and retain it by cooperation with said receiving roller, and a pressing member disposed between two adjacent cutting blades for reciprocal movement between a retreated position in which said pressing member permits the cutting and retaining of said friction material segment by the cutting blades and an advanced position in which said pressing member pushes out said friction material segment from a position between the two cutting blades to press it against said bonding surface;

means for reversing the annular core to direct its other bonding surface upwards upon completion of adhering of the friction material segments to one bonding surface; and means for pressing the annular core with the friction material segments adhered to both of its opposite bonding surfaces, in order to form the friction plate.

4. An apparatus for manufacturing a friction plate for a clutch, said friction plate being comprised of a large number of friction material segments adhesively bonded to each of opposite bonding surfaces of an annular core in a circumferential direction of the core with oil grooves provided between adjacent segments, said apparatus comprising:

a support for positioning said core thereon with either of said opposite bonding surfaces having an adhesive applied thereto being turned upwards, said support being intermittently rotated for adhesive-bonding of every one of the friction material segments;

a plurality of unwinding mechanisms for intermittently unwinding a plurality of friction material tapes each in an amount corresponding to one friction material segment to a plurality of unwound positions arranged above said support at equal distances in a circumferential direction of said core; and a plurality of liftable pressing mechanisms for subjecting said friction material tapes to a cutting, and pressing and adhesively bonding said resulting friction material segments to said core;

means for reversing the annular core to direct its other bonding surface upwards upon completion of adhering of the friction material segments to one bonding surface; and means for pressing the annular core with the friction material segments adhered to both of its opposite bonding surfaces, in order to form the friction plate.

* * * * *

UNITED STATES PATENT AND TRADEMARK OFFICE
CERTIFICATE OF CORRECTION

PATENT NO.:     5,571,372
DATED      :     November 5, 1996
INVENTOR(S):    Kazuomi MIYAISHI et al It is certified that error appears in the above-identified patent and that said Letters Patent is hereby corrected as shown below:

On the Title Page, item [62], delete "Division of Ser. No. 922,921, Jun 21, 1992" and add --Division of Ser. No. 922,921, Jul 31, 1992--

Signed and Sealed this

Eighteenth Day of February, 1997

Attest:

BRUCE LEHMAN

*Attesting Officer*        *Commissioner of Patents and Trademarks*